US008131396B2

(12) United States Patent
Yamada

(10) Patent No.: US 8,131,396 B2
(45) Date of Patent: Mar. 6, 2012

(54) NUMERICAL CONTROL APPARATUS AND NUMERICAL CONTROL SYSTEM

(75) Inventor: Yoshinori Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 206 days.

(21) Appl. No.: 12/596,941

(22) PCT Filed: Apr. 26, 2007

(86) PCT No.: PCT/JP2007/059014
§ 371 (c)(1),
(2), (4) Date: Jan. 26, 2010

(87) PCT Pub. No.: WO2008/136110
PCT Pub. Date: Nov. 13, 2008

(65) Prior Publication Data
US 2010/0185316 A1 Jul. 22, 2010

(51) Int. Cl.
G06F 19/00 (2011.01)
G05B 19/18 (2006.01)
G05B 11/01 (2006.01)
(52) U.S. Cl. .............. 700/189; 700/3; 700/20
(58) Field of Classification Search .............. 700/3, 9, 700/20, 189
See application file for complete search history.

(56) References Cited

U.S. PATENT DOCUMENTS

| 5,850,338 A * | 12/1998 | Fujishima ............ 700/3 |
| 2004/0002778 A1* | 1/2004 | Giamona et al. ........ 700/61 |
| 2005/0055132 A1 | 3/2005 | Matsumoto et al. |
| 2006/0262807 A1 | 11/2006 | Aoki et al. |

FOREIGN PATENT DOCUMENTS

| JP | 03-028908 A | 2/1991 |
| JP | 06-035528 A | 2/1994 |
| JP | 09-146623 A | 6/1997 |
| JP | 2003-145462 A | 5/2003 |
| JP | 2005-173849 A | 6/2005 |
| JP | 2005-246543 A | 9/2005 |
| WO | 2005/036288 A1 | 4/2005 |

* cited by examiner

Primary Examiner — Sean Shechtman
(74) Attorney, Agent, or Firm — Sughrue Mion, PLLC

(57) ABSTRACT

A first NC apparatus includes a virtual-axis setting unit that sets a predetermined axis coupled to a second NC apparatus as an axis controlled by itself. The second NC apparatus includes an axis-control-right switch processing unit that switches a control right of an axis set by an external-switching-axis setting unit between the first and the second NC apparatuses. When the control right is switched to the first NC apparatus, the first NC apparatus synchronously controls a predetermined axis coupled to the first NC apparatus with a predetermined axis coupled to the second NC apparatus and set by the first virtual-axis setting unit.

15 Claims, 23 Drawing Sheets

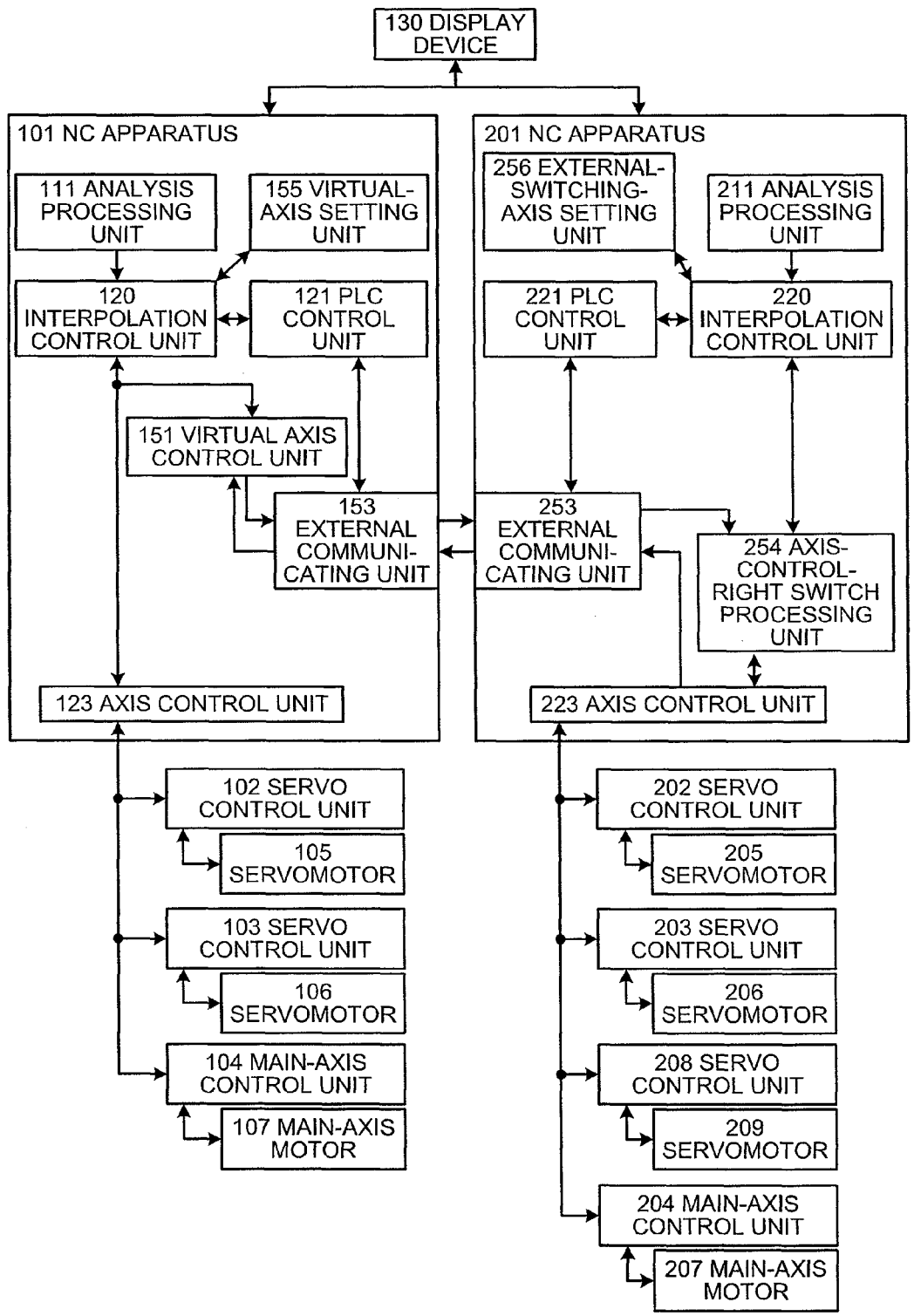

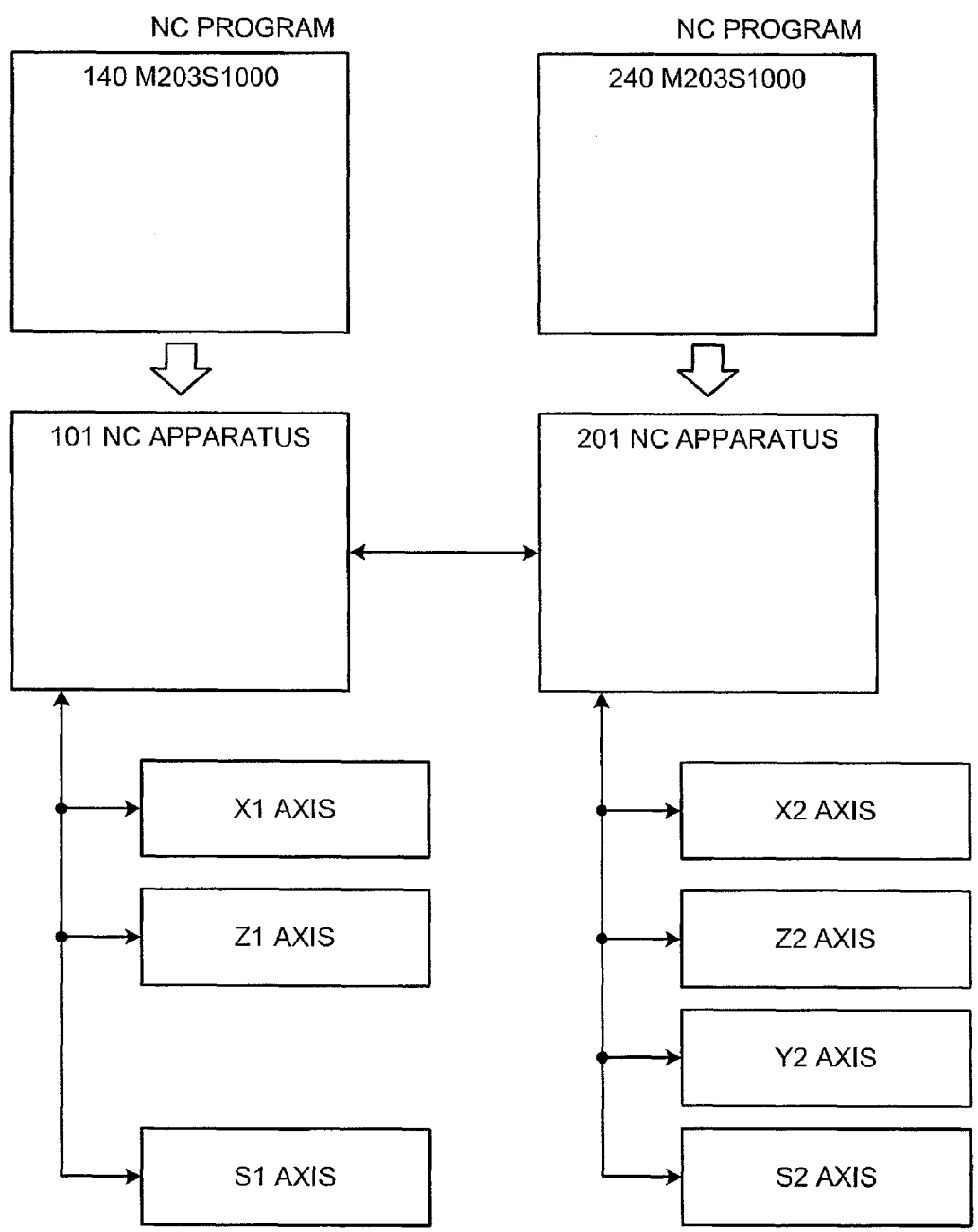

FIG.3

(1) SETTING OF NC APPARATUS 101
[NC AXIS]

| AXIS | VIRTUAL AXIS | OUTPUT STATION | EXTERNAL-SWITCHING EFFECTIVE AXIS | INPUT STATION 1 | INPUT STATION 2 |
|---|---|---|---|---|---|
| X1 | INEFFECTIVE | 01 | INEFFECTIVE | - | - |
| Z1 | INEFFECTIVE | 02 | INEFFECTIVE | - | - |

[MAIN AXIS]

| AXIS | VIRTUAL AXIS | OUTPUT STATION | EXTERNAL-SWITCHING EFFECTIVE AXIS | INPUT STATION 1 | INPUT STATION 2 |
|---|---|---|---|---|---|
| S1 | INEFFECTIVE | 03 | INEFFECTIVE | - | - |
| S2 | EFFECTIVE | V01 | INEFFECTIVE | - | - |

[SETTING OF VIRTUAL-AXIS OUTPUT STATION]

| OUTPUT STATION | CONNECTION DESTINATION |
|---|---|
| V01 | M02-P01 |
| V02 | - |

[SETTING OF EXTERNAL INPUT STATION]

| INPUT STATION | CONNECTION DESTINATION |
|---|---|
| P01 | - |
| P02 | - |

(2) SETTING OF NC APPARATUS 201
[NC AXIS]

| AXIS | VIRTUAL AXIS | OUTPUT STATION | EXTERNAL-SWITCHING EFFECTIVE AXIS | INPUT STATION 1 | INPUT STATION 2 |
|---|---|---|---|---|---|
| X2 | INEFFECTIVE | 01 | INEFFECTIVE | - | - |
| Z2 | INEFFECTIVE | 02 | INEFFECTIVE | - | - |
| Y2 | INEFFECTIVE | 03 | INEFFECTIVE | - | - |

[MAIN AXIS]

| AXIS | VIRTUAL AXIS | OUTPUT STATION | EXTERNAL-SWITCHING EFFECTIVE AXIS | INPUT STATION 1 | INPUT STATION 2 |
|---|---|---|---|---|---|
| S2 | INEFFECTIVE | 04 | EFFECTIVE | P01 | - |

[SETTING OF VIRTUAL-AXIS OUTPUT STATION]

| OUTPUT STATION | CONNECTION DESTINATION |
|---|---|
| V01 | - |
| V02 | - |

[SETTING OF EXTERNAL INPUT STATION]

| INPUT STATION | CONNECTION DESTINATION |
|---|---|
| P01 | M01-V01 |
| P02 | - |

```
140    NC PROGRAM              240    NC PROGRAM

N10    S2000                   N10    S1000

N30    G44S500
N31    G95Z100F1
                               N40    G43S800

N50    S2=300
N51    G33Z200F0.5
```

FIG.14
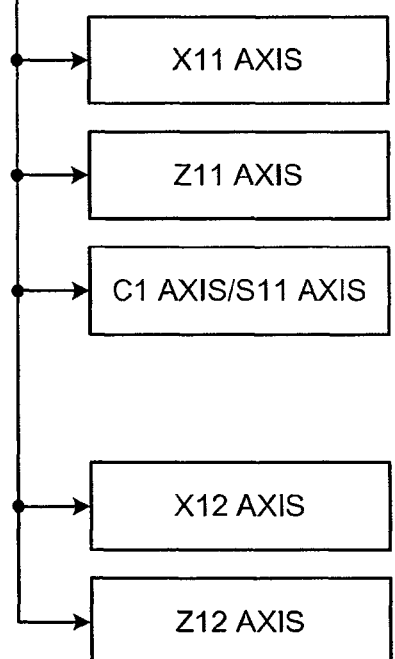
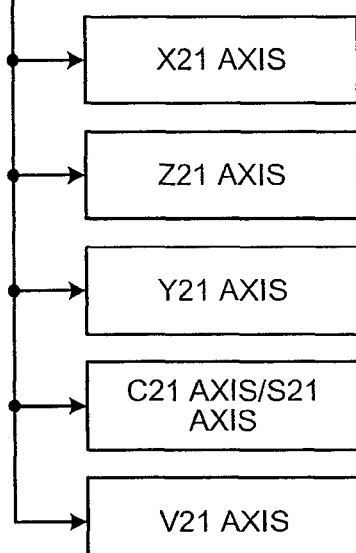

FIG. 15

(1) SETTING OF NC APPARATUS 101
[VIRTUAL AXIS]

| VIRTUAL AXIS STATION COMMUNICATION STATION | NAME OF AXIS | CONNECTION DESTINATION |
|---|---|---|
| V01 | C21 | M02-P01 |
| V02 | V21 | M02-P02 |
| V03 | UNSET | UNSET |
| V04 | UNSET | UNSET |

[EXTERNAL-SWITCHING EFFECTIVE AXIS]

| EXTERNAL-SWITCHING EFFECTIVE AXIS COMMUNICATION STATION | NAME OF AXIS | CONNECTION DESTINATION | TYPE OF AXIS |
|---|---|---|---|
| P01 | C11 | M02-V01 | SVSP |
| P02 | UNSET | UNSET | UNSET |
| P03 | UNSET | UNSET | UNSET |
| P04 | UNSET | UNSET | UNSET |

(2) SETTING OF NC APPARATUS 201
[VIRTUAL AXIS]

| VIRTUAL AXIS STATION COMMUNICATION STATION | NAME OF AXIS | CONNECTION DESTINATION |
|---|---|---|
| V01 | C11 | M01-P01 |
| V02 | UNSET | UNSET |
| V03 | UNSET | UNSET |
| V04 | UNSET | UNSET |

[EXTERNAL-SWITCHING EFFECTIVE AXIS]

| EXTERNAL-SWITCHING EFFECTIVE AXIS COMMUNICATION STATION | NAME OF AXIS | CONNECTION DESTINATION | TYPE OF AXIS |
|---|---|---|---|
| P01 | C21 | M01-V01 | SVSP |
| P02 | V21 | M01-V02 | SV |
| P03 | UNSET | UNSET | UNSET |
| P04 | UNSET | UNSET | UNSET |

FIG. 16

| 141 NC APPARATUS 101 FIRST SYSTEM PROGRAM | 142 NC APPARATUS 101 SECOND SYSTEM PROGRAM | 241 NC APPARATUS 201 FIRST SYSTEM PROGRAM |
|---|---|---|
|  |  |  |
| : | N2 G140 X=X12 Z=Z12 C=C11 | : |
| N1 G140X=X11 Z=Z11C=C21 | : | N4 G140X=X21 Z=Z21Y=Y21C=C11 |
| : | : | : |
| : | N3 G140 X=X12 Z=Z12 V=V21 |  |
|  |  |  |
|  |  |  |
|  |  |  |

NC APPARATUS 1

|  | SYSTEM 1 | SYSTEM 2 | SYSTEM 3 | SYSTEM 4 | UNUSED AXIS |
|---|---|---|---|---|---|
| FIRST AXIS | X1 | X2 | X3 | X4 | C1 (S1) * |
| SECOND AXIS | Z1 | Z2 | Z3 | Z4 | C2 (S2) * |
| THIRD AXIS | C6 (S6) * | C5 (S5) * | C4 (S4) * | C3 (S3) * |  |

*: VIRTUAL AXIS

NC APPARATUS 2

|  | SYSTEM 1 | SYSTEM 2 |  | UNUSED AXIS |
|---|---|---|---|---|
| FIRST AXIS | X5 | X6 |  | C3 (S3) |
| SECOND AXIS | Z5 | Z6 |  | C4 (S4) |
| THIRD AXIS | Y5 | Y6 |  | C5 (S5) |
| FOURTH AXIS | C2 (S2) | C1 (S1) |  | C6 (S6) |

FIG.21

FIRST CYCLE

|  | NC APPARATUS 1 | | | | NC APPARATUS 2 | |
|---|---|---|---|---|---|---|
|  | SYSTEM 1 | SYSTEM 2 | SYSTEM 3 | SYSTEM 4 | SYSTEM 1 | SYSTEM 2 |
| FIRST AXIS | X1 | X2 | X3 | X4 | X5 | X6 |
| SECOND AXIS | Z1 | Z2 | Z3 | Z4 | Z5 | Z6 |
| THIRD AXIS | C1 (S1) * | C6 (S6) * | C5 (S5) * | C4 (S4) * | Y5 | Y6 |
| FOURTH AXIS | - | - | - | - | C3 (S3) | C2 (S2) |

FIG.22

SECOND CYCLE

|  | NC APPARATUS 1 | | | | NC APPARATUS 2 | |
|---|---|---|---|---|---|---|
|  | SYSTEM 1 | SYSTEM 2 | SYSTEM 3 | SYSTEM 4 | SYSTEM 1 | SYSTEM 2 |
| FIRST AXIS | X1 | X2 | X3 | X4 | X5 | X6 |
| SECOND AXIS | Z1 | Z2 | Z3 | Z4 | Z5 | Z6 |
| THIRD AXIS | C2 (S2) * | C1 (S1) * | C6 (S6) * | C5 (S5) * | Y5 | Y6 |
| FOURTH AXIS | - | - | - | - | C4 (S4) | C3 (S3) |

FIG.23

THIRD CYCLE

|  | NC APPARATUS 1 | | | | NC APPARATUS 2 | |
|---|---|---|---|---|---|---|
|  | SYSTEM 1 | SYSTEM 2 | SYSTEM 3 | SYSTEM 4 | SYSTEM 1 | SYSTEM 2 |
| FIRST AXIS | X1 | X2 | X3 | X4 | X5 | X6 |
| SECOND AXIS | Z1 | Z2 | Z3 | Z4 | Z5 | Z6 |
| THIRD AXIS | C3 (S3) * | C2 (S2) * | C1 (S1) * | C6 (S6) * | Y5 | Y6 |
| FOURTH AXIS | - | - | - | - | C5 (S5) | C4 (S4) |

FIG.24

FOURTH CYCLE

|  | NC APPARATUS 1 | | | | NC APPARATUS 2 | |
|---|---|---|---|---|---|---|
|  | SYSTEM 1 | SYSTEM 2 | SYSTEM 3 | SYSTEM 4 | SYSTEM 1 | SYSTEM 2 |
| FIRST AXIS | X1 | X2 | X3 | X4 | X5 | X6 |
| SECOND AXIS | Z1 | Z2 | Z3 | Z4 | Z5 | Z6 |
| THIRD AXIS | C4 (S4) * | C3 (S3) * | C2 (S2) * | C1 (S1) * | Y5 | Y6 |
| FOURTH AXIS | - | - | - | - | C6 (S6) | C5 (S5) |

FIG.25

FIFTH CYCLE

|  | NC APPARATUS 1 | | | | NC APPARATUS 2 | |
|---|---|---|---|---|---|---|
|  | SYSTEM 1 | SYSTEM 2 | SYSTEM 3 | SYSTEM 4 | SYSTEM 1 | SYSTEM 2 |
| FIRST AXIS | X1 | X2 | X3 | X4 | X5 | X6 |
| SECOND AXIS | Z1 | Z2 | Z3 | Z4 | Z5 | Z6 |
| THIRD AXIS | C5 (S5) * | C4 (S4) * | C3 (S3) * | C2 (S2) * | Y5 | Y6 |
| FOURTH AXIS | - | - | - | - | C1 (S1) | C6 (S6) |

SIXTH CYCLE

|  | NC APPARATUS 1 | | | | NC APPARATUS 2 | |
|---|---|---|---|---|---|---|
|  | SYSTEM 1 | SYSTEM 2 | SYSTEM 3 | SYSTEM 4 | SYSTEM 1 | SYSTEM 2 |
| FIRST AXIS | X1 | X2 | X3 | X4 | X5 | X6 |
| SECOND AXIS | Z1 | Z2 | Z3 | Z4 | Z5 | Z6 |
| THIRD AXIS | C6 (S6)* | C5 (S5)* | C4 (S4)* | C3 (S3)* | Y5 | Y6 |
| FOURTH AXIS | - | - | - | - | C2 (S2) | C1 (S1) |

United States Patent — US 8,131,396 B2

NUMERICAL CONTROL APPARATUS AND NUMERICAL CONTROL SYSTEM

CROSS REFERENCE TO RELATED APPLICATIONS

This application is a National Stage of International Application No. PCT/JP2007/059014 filed Apr. 26, 2007 the contents of all of which are incorporated herein by reference in their entirety.

TECHNICAL FIELD

The present invention relates to a numerical control (hereinafter, "NC") apparatus and an NC system for controlling a plurality of systems.

BACKGROUND ART

A conventional multi-axis/multi-system NC apparatus is configured as shown in FIG. 30, and has analysis processing units 111 and 112 of plural systems within one NC apparatus. For each system, each analysis processing unit reads each block of an NC program of each system stored in a memory (not shown), and analyzes the program for an interpolation control unit 120 to perform an interpolation process. As a result of the interpolation process by the interpolation control unit 120, a shift pulse of each control axis is generated. An axis control unit 123 outputs the shift pulse to servo control units 102, 103, 202, and 203 and main-axis control units 104 and 204 that drive corresponding axes.

The servo control units 102, 103, 202, and 203 drive coupled servomotors 105, 106, 205, and 206, respectively, following an instructed shift pulse. The main-axis control units 104 and 204 drive coupled main-axis motors 107 and 207, respectively, following an instructed shift pulse. The axis control unit 123 provided in the NC apparatus can drive control axes of the servo control units 102, 103, 202, and 203 or the main-axis control units 104 and 204 that are coupled.

This realizes plural sets of control systems within one unit of hardware. An NC machine tool controlled by a machining program independent in each system and by each control signal and including this NC apparatus can machine each one of or plural products that are the same or different in plural control systems.

In an example of the NC apparatus shown in FIG. 30, the apparatus includes a display device 130, a PLC control unit 121, and an axis exchange control unit 122. The servo control units 102 and 103, the main-axis control unit 104, the servomotors 105 and 106, and the main-axis motor 107 belong to a first system, and the servo control units 202 and 203, the main-axis control unit 204, the servomotors 205 and 206, and the main-axis motor 207 belong to a second system.

In the conventional multi-axis/multi-system NC apparatus, the axis exchange control unit 122 is configured to be able to exchange between the systems a part or a whole of control axes belonging to each system.

In the conventional multi-axis/multi-system NC apparatus, the axis exchange control unit 122 is configured to be able to exchange between the systems a part or a whole of control axes belonging to each system.

FIG. 31 is an example of machine tools that can be controlled by the conventional multi-axis/multi-system NC apparatus. In the example shown in FIG. 31, an X1 axis that drives a tool table #1 and a Z1 axis that shifts a workpiece grasped with a main axis to a longitudinal direction constitute the first system, and an X2 axis that drives a tool table #2 and a Z2 axis constitute the second system.

Normally, in the first system, a program is instructed to the X1 axis, the Z1 axis, and an S1 axis, and machining is performed by combination of the tool table #1 and the main axis S1. In the second system, a program is instructed to the X2 axis, the Z2 axis, and an S2 axis, and machining is performed by combination of the tool table #2 and the main axis S2.

In the conventional multi-axis/multi-system NC apparatus, the axis exchange control unit exchanges the Z1 axis of the first system and the Z2 axis of the second system between the systems for the second system to be able to instruct to the X2 axis, the Z1 axis, and the S1 axis, for example, and machining is performed by combination of the tool table #2 and the main axis S3. With this arrangement, machining time can be shortened, and complex machining can be performed (for example, see Patent Document 1).

The conventional NC apparatus described above needs to control all systems and axes on one unit of hardware. Therefore, the number of controllable systems and the number of controllable axes are naturally limited by memories and a CPU processing speed.

Consequently, when there is a request for increasing the number of systems and the number of axes requiring control, an NC apparatus installed with larger-capacity memories and a higher-speed CPU needs to be additionally developed, and its development cost increases.

Most of such controlling targets requiring a large number of systems and a large number of axes are special exclusive machine tools or large-scale NC machining systems. When development common to an NC apparatus applicable to a general NC machine tool is performed, its manufacturing cost increases, because of hardware that requires performance higher than is necessary to be applied to the general NC machine tool.

To solve a part of the above problems, there has been known a method that one NC apparatus being a master and plural NC apparatuses being slaves are provided, and that each NC apparatus at a slave side performs synchronization control, while each NC apparatus at the slave side is synchronized by a signal and the like from the master NC apparatus.

Because plural slave NC apparatuses operate synchronously with one NC apparatus being a master, the number of simultaneously operable systems can be increased by increasing NC apparatuses being slaves (for example, see Patent Document 2).

There has also been known an automatic machine-control system controlled by plural automatic machines via a communication path, wherein the automatic machine-control system safely and stably controls plural automatic machines by exclusively managing automatic machines having a shared axis indirectly controlled by plural control apparatuses.

This controls occupancy of a shared axis that can be indirectly controlled from other automatic machine via a communication path, and performs exclusive control to avoid simultaneous indirect control from plural control apparatuses. The above automatic machine-control system is such that, in an automatic machine-control system in which a master automatic machine and slave automatic machines of which occupancy right is obtained by the master automatic machine perform co-operation, when two or more master automatic machines are present to control the slave automatic machines, the slave automatic machines receive plural instructions from different automatic machines, and operation is not guaranteed. Therefore, the automatic machine-control system described above controls the occupancy right of an automatic machine controlled by other control apparatus, thereby performing safe and stable control (for example, see Patent Document 3).

Patent Document 1: Japanese Patent Application Laid-open No. H3-28908
Patent Document 2: Japanese Patent Application Laid-open No. H9-146623
Patent Document 3: Japanese Patent Application Laid-open No. 2005-173849

DISCLOSURE OF INVENTION

Problem to be Solved by the Invention

However, in the NC apparatus disclosed in Patent Document 2 mentioned above, axes that can be exchanged between the systems are limited to axes controllable by the same CPU. Even when the number of systems simultaneously operated is increased by increasing NC apparatuses, control axes of systems of different NC apparatuses cannot be simultaneously controlled freely.

In the automatic machine-control system disclosed in Patent Document 3 mentioned above, operation of each automatic machine is performed by a control apparatus that controls the same automatic machine. Only a slave control apparatus performs operation control based on a position instruction from a master automatic machine that is permitted to occupy a slave automatic machine. There is no clear description about a correlation between the master automatic machine and the slave automatic machine during shift. Interpolation and synchronization between an axis of a master control apparatus and an axis of the slave control apparatus are not guaranteed.

The present invention has been achieved to solve the above problems, and an object of the invention is to obtain an NC apparatus and an NC system capable of freely performing interpolation control and synchronization control by combining axes without being conscious about control axes of different NC apparatuses.

Means for Solving Problem

A numerical control apparatus according to the present invention includes: a virtual-axis setting unit that sets a predetermined axis coupled to an external numerical control apparatus as an axis controlled by the numerical control apparatus; an external communicating unit that transmits interpolation data of an axis set by the virtual-axis setting unit to the external numerical control apparatus, and receives feedback data from the external numerical control apparatus; an analysis processing unit that analyzes an NC program; an interpolation control unit that interpolates a result of analysis from the analysis processing unit based on the feedback data; and a virtual axis control unit that outputs, when an interpolation output from the interpolation control unit is the interpolation data of the axis set by the virtual-axis setting unit, the interpolation data to the external numerical control apparatus via the external communicating unit. The numerical control apparatus synchronously controls a predetermined axis coupled to the numerical control apparatus with the predetermined axis coupled to the external numerical control apparatus set by the virtual-axis setting unit based on the interpolation output from the interpolation control unit.

Furthermore, a numerical control apparatus according to the present invention includes: an external-switching-axis setting unit that sets a predetermined axis coupled to the numerical control apparatus as an axis controlled by an external numerical control apparatus; an external communicating unit that transmits feedback data of the numerical control apparatus to the external numerical control apparatus, and receives interpolation data of an axis set by the external-switching-axis setting unit from the external numerical control apparatus; an analysis processing unit that analyzes an NC program; an interpolation control unit that interpolates a result of analysis from the analysis processing unit; and an axis-control-right switch processing unit that switches a control right of controlling the axis set by the external-switching-axis setting unit between the numerical control apparatus and the external numerical control apparatus. When the control right of controlling the axis set by the external-switching-axis setting unit is switched to the external numerical control apparatus by the axis-control-right switch processing unit, the axis set by the external-switching-axis setting unit is controlled synchronously with the axis coupled to the external numerical control apparatus by the external numerical control apparatus based on the interpolation data from the external numerical control apparatus.

Moreover, a numerical control apparatus according to the present invention includes: a virtual-axis setting unit that sets a predetermined axis coupled to an external numerical control apparatus as an axis controlled by the numerical control apparatus; an external-switching-axis setting unit that sets a predetermined axis coupled to the numerical control apparatus as an axis controlled by the external numerical control apparatus; an external communicating unit that transmits interpolation data of the axis set by the virtual-axis setting unit and feedback data of the numerical control apparatus to the external numerical control apparatus, and receives interpolation data of an axis set by the external-switching-axis setting unit and feedback data of the external numerical control apparatus from the external numerical control apparatus; an analysis processing unit that analyzes an NC program; an interpolation control unit that interpolates a result of analysis from the analysis processing unit based on the feedback data of the external numerical control apparatus; a virtual axis control unit that outputs, when an interpolation output from the interpolation control unit is the interpolation data of the axis set by the virtual-axis setting unit, the interpolation data to the external numerical control apparatus via the external communicating unit; and an axis-control-right switch processing unit that switches a control right of controlling the axis set by the external-switching-axis setting unit between the numerical control apparatus and the external numerical control apparatus. The numerical control apparatus synchronously controls a predetermined axis coupled to the numerical control apparatus with the predetermined axis coupled to the external numerical control apparatus set by the virtual-axis setting unit based on the interpolation output from the interpolation control unit, and when the control right of controlling the axis set by the external-switching-axis setting unit is switched to the external numerical control apparatus by the axis-control-right switch processing unit, the axis set by the external-switching-axis setting unit is controlled synchronously with the axis coupled to the external numerical control apparatus by the external numerical control apparatus based on the interpolation data from the external numerical control apparatus.

Furthermore, a numerical control apparatus according to the present invention includes: a virtual-axis setting unit that sets a predetermined axis coupled to an external numerical control apparatus as an axis controlled by the numerical control apparatus; an external-switching-axis setting unit that sets a predetermined axis coupled to the numerical control apparatus as an axis controlled by the external numerical control apparatus; an external communicating unit that transmits interpolation data of the axis set by the virtual-axis setting unit and feedback data of the numerical control apparatus to the external numerical control apparatus, and receives interpolation data of an axis set by the external-switching-axis setting unit and feedback data of the external numerical control apparatus from the external numerical control apparatus; an axis exchange control unit that performs an axis exchange between an axis of a predetermined system coupled to the numerical control apparatus and an axis of a predetermined system coupled to the external numerical control apparatus and set by the virtual-axis setting unit; an analysis processing unit that analyzes an NC program; an interpolation control unit that interpolates a result of analysis from the analysis processing unit based on the feedback data of the external numerical control apparatus, and interpolates in a system of a combination of axes exchanged by the axis exchange control unit; a virtual axis control unit that outputs, when an interpolation output from the interpolation control unit is the interpolation data of the axis set by the virtual-axis setting unit, the interpolation output to the external numerical control apparatus via the external communicating unit; and an axis-control-right switch processing unit that switches a control right of controlling the axis set by the external-switching-axis setting unit between the numerical control apparatus and the external numerical control apparatus. When the control right of controlling the axis set by the external-switching-axis setting unit is switched to the numerical control apparatus by the axis-control-right switch processing unit, an axis that is axis-exchanged with an axis of a predetermined system coupled to the external numerical control apparatus and coupled to the numerical control apparatus is controlled synchronously with an axis coupled to the numerical control apparatus as an axis of a predetermined system coupled to the numerical control apparatus, based on the interpolation output from the interpolation control unit, and when the control right of controlling the axis set by the external-switching-axis setting unit is switched to the external numerical control apparatus by the axis-control-right switch processing unit, a predetermined axis that is axis-exchanged with an axis of a predetermined system coupled to the numerical control apparatus and coupled to the external numerical control apparatus is controlled as an axis of a predetermined system coupled to the external numerical control apparatus by the external numerical control apparatus based on the interpolation data from the external numerical control apparatus.

Moreover, the numerical control apparatus according to the present invention further includes a delay control unit that delays an interpolation output to an axis coupled to the numerical control apparatus to match control timings of the axis coupled to the numerical control apparatus and an axis coupled to the external numerical control apparatus.

Furthermore, the numerical control apparatus according to the present invention is featured in that the interpolation output from the interpolation control unit is speed instruction data, and the feedback data from the external numerical control apparatus is position data.

Moreover, the numerical control apparatus according to the present invention is featured in that the interpolation output from the interpolation control unit is position instruction data, and the feedback data from the external numerical control apparatus is position data.

Furthermore, the numerical control apparatus according to the present invention is featured in that the interpolation control unit outputs either one of speed instruction data and position instruction data corresponding to an axis set by the virtual-axis setting unit.

Moreover, a numerical control system according to the present invention includes a first numerical control apparatus and a second numerical control apparatus. The first numerical control apparatus includes a virtual-axis setting unit that sets a predetermined axis coupled to a second numerical control apparatus as an axis controlled by the first numerical control apparatus, a first external-communicating unit that transmits interpolation data of an axis set by the virtual-axis setting unit to the second numerical control apparatus, and receives feedback data from the second numerical control apparatus, a first analysis processing unit that analyzes an NC program, a first interpolation control unit that interpolates a result of analysis from the analysis processing unit based on the feedback data, and a virtual axis control unit that outputs, when an interpolation output from the interpolation control unit is the interpolation data of the axis set by the virtual-axis setting unit, the interpolation data to the second numerical control apparatus via the external communicating unit. The second numerical control apparatus includes an external-switching-axis setting unit that sets a predetermined axis coupled to the second numerical control apparatus as an axis controlled by the first numerical control apparatus, a second external-communicating unit that transmits feedback data of the second numerical control apparatus to the first numerical control apparatus, and receives interpolation data of an axis set by the external-switching-axis setting unit from the first numerical control apparatus, a second analysis processing unit that analyzes an NC program, a second interpolation control unit that interpolates a result of analysis from the analysis processing unit, and an axis-control-right switch processing unit that switches a control right of controlling the axis set by the external-switching-axis setting unit between the first numerical control apparatus and the second numerical control apparatus. When the control right is switched to the first numerical control apparatus by the axis-control-right switch processing unit, the first numerical control apparatus synchronously controls a predetermined axis coupled to the first numerical control apparatus with a predetermined axis coupled to the second numerical control apparatus and set by the first virtual-axis setting unit based on the interpolation output from the first interpolation control unit.

Furthermore, a numerical control system according to the present invention includes a first numerical control apparatus and a second numerical control apparatus. The first numerical control apparatus includes a first virtual-axis setting unit that sets a predetermined axis coupled to the second numerical control apparatus as an axis controlled by the first numerical control apparatus, a first external-switching-axis setting unit that sets a predetermined axis coupled to the first numerical control apparatus as an axis controlled by the second numerical control apparatus, a first external-communicating unit that transmits interpolation data of the axis set by the virtual-axis setting unit and feedback data of the first numerical control apparatus to the second numerical control apparatus, and receives interpolation data of an axis set by the external-switching-axis setting unit and feedback data of the second numerical control apparatus from the second numerical control apparatus, a first analysis processing unit that analyzes an NC program, a first interpolation control unit that interpolates a result of analysis from the analysis processing unit based on the feedback data of the second numerical control apparatus, a first virtual axis control unit that outputs, when an interpolation output from the interpolation control unit is the interpolation data of the axis set by the virtual-axis setting unit, the interpolation data to the second numerical control apparatus via the external communicating unit, and a first axis-control-right switch processing unit that switches a control right of controlling the axis set by the external-switching-axis setting unit between the first numerical control apparatus and the second numerical control apparatus. The second numerical control apparatus includes a second virtual-axis setting unit that sets a predetermined axis coupled to the first numerical control apparatus as an axis controlled by the second numerical control apparatus, a second external-switching-axis setting unit that sets a predetermined axis coupled to the second numerical control apparatus as an axis controlled by the first numerical control apparatus, a second external-communicating unit that transmits interpolation data of the axis set by the second virtual-axis setting unit and feedback data of the second numerical control apparatus to the first numerical control apparatus, and receives interpolation data of an axis set by the second external-switching-axis setting unit and feedback data of the first numerical control apparatus from the first numerical control apparatus, a second analysis processing unit that analyzes an NC program, a second interpolation control unit that interpolates a result of analysis from the analysis processing unit based on the feedback data of the first numerical control apparatus, a second virtual axis control unit that outputs, when an interpolation output from the interpolation control unit is the interpolation data of the axis set by the second virtual-axis setting unit, the interpolation data to the first numerical control apparatus via the second external-communicating unit, and a second axis-control-right switch processing unit that switches the control right of controlling the axis set by the second external-switching-axis setting unit between the first numerical control apparatus and the second numerical control apparatus. When the control right is switched to the first numerical control apparatus by the second axis-control-right switch processing unit, the first numerical control apparatus synchronously controls a predetermined axis coupled to the first numerical control apparatus with a predetermined axis coupled to the second numerical control apparatus and set by the first virtual-axis setting unit based on the interpolation output from the first interpolation control unit, and when the control right is switched to the second numerical control apparatus by the first axis-control-right switch processing unit, the second numerical control apparatus synchronously controls a predetermined axis coupled to the second numerical control apparatus with a predetermined axis coupled to the first numerical control apparatus and set by the second virtual-axis setting unit based on the interpolation output from the second interpolation control unit.

Moreover, a numerical control system according to the present invention includes a first numerical control apparatus and a second numerical control apparatus. The first numerical control apparatus includes a first virtual-axis setting unit that sets a predetermined axis coupled to a second numerical control apparatus as an axis controlled by the first numerical control apparatus, a first external-switching-axis setting unit that sets a predetermined axis coupled to the first numerical control apparatus as an axis controlled by the second numerical control apparatus, a first external-communicating unit that transmits interpolation data of the axis set by the virtual-axis setting unit and feedback data of the first numerical control apparatus to the second numerical control apparatus, and receives interpolation data of an axis set by the external-switching-axis setting unit and feedback data of the second numerical control apparatus from the second numerical control apparatus, a first axis-exchange control unit that performs an axis exchange between an axis of a predetermined system coupled to the first numerical control apparatus and an axis of a predetermined system coupled to the second numerical control apparatus and set by the virtual-axis setting unit, a first analysis processing unit that analyzes an NC program, a first interpolation control unit that interpolates a result of analysis from the analysis processing unit based on the feedback data of the second numerical control apparatus and interpolates in a system of a combination of axes exchanged by the axis exchange control unit, a first virtual axis control unit that outputs, when an interpolation output from the interpolation control unit is interpolation data of the axis set by the virtual-axis setting unit, the interpolation output to the second numerical control apparatus via the external communicating unit, and a first axis-control-right switch processing unit that switches a control right of controlling the axis set by the external-switching-axis setting unit between the first numerical control apparatus and the second numerical control apparatus. The second numerical control apparatus includes a second virtual-axis setting unit that sets a predetermined axis coupled to the first numerical control apparatus as an axis controlled by the second numerical control apparatus, a second external-switching-axis setting unit that sets a predetermined axis coupled to the second numerical control apparatus as an axis controlled by the first numerical control apparatus, a second external-communicating unit that transmits interpolation data of the axis set by the second virtual-axis setting unit and feedback data of the second numerical control apparatus to the first numerical control apparatus, and receives interpolation data of an axis set by the second external-switching-axis setting unit and feedback data of the first numerical control apparatus from the first numerical control apparatus, a second axis-exchange control unit that performs an axis exchange between an axis of a predetermined system coupled to the second numerical control apparatus and an axis of a predetermined system coupled to the first numerical control apparatus and set by the second virtual-axis setting unit, a second analysis processing unit that analyzes an NC program, a second interpolation control unit that interpolates a result of analysis from the analysis processing unit based on the feedback data of the first numerical control apparatus and interpolates in a system of a combination of axes exchanged by the second axis-exchange control unit, a second virtual axis control unit that outputs, when an interpolation output from the interpolation control unit is interpolation data of the axis set by the second virtual-axis setting unit, the interpolation output to the first numerical control apparatus via the second external-communicating unit, and a second axis-control-right switch processing unit that switches control the right of controlling the axis set by the second external-switching-axis setting unit between the first numerical control apparatus and the second numerical control apparatus. When the control right is switched to the first numerical control apparatus by the second axis-control-right switch processing unit, the first numerical control apparatus controls an axis axis-exchanged with an axis of a predetermined system coupled to the second numerical control apparatus and coupled to the first numerical control apparatus, as an axis of a predetermined system coupled to the first numerical control apparatus, synchronously with the axis of the predetermined system coupled to the first numerical control apparatus, based on an output from the first interpolation control unit, and when the control right is switched to the second numerical control apparatus by the first axis-control-right switch processing unit, the second numerical control apparatus controls an axis axis-exchanged with an axis of a predetermined system coupled to the first numerical control apparatus and also coupled to the second numerical control apparatus, as an axis of a predetermined system coupled to the second numerical control apparatus, synchronously with the axis of the predetermined system coupled to the second numerical control apparatus, based on an output from the second interpolation control unit.

Furthermore, the numerical control system according to the present invention is featured in that at least one of the first numerical control apparatus and the second numerical control apparatus further includes a delay control unit that delays an interpolation output to an axis coupled to own respective numerical control apparatus, to match control timings of an axis coupled to the own respective numerical control apparatus and an axis coupled to other numerical control apparatus connected with each other.

Moreover, the numerical control system according to the present invention is featured in that the interpolation output from at least one of the first interpolation control unit and the second interpolation control unit is speed instruction data, and the feedback data from the first and second numerical control units is position data.

Furthermore, the numerical control system according to the present invention is featured in that the interpolation output from at least one of the first interpolation control unit and the second interpolation control unit is position instruction data, and the feedback data from the first and second numerical control units is position data.

Moreover, the numerical control system according to the present invention is featured in that at least one of the first interpolation control unit and the second interpolation control unit outputs either one of speed instruction data and position instruction data corresponding to an axis set by the virtual-axis setting unit.

Effect of the Invention

According to the present invention, interpolation control and synchronization control can be performed by freely combining control axes coupled to each NC apparatus having different hardware.

Therefore, when the invention is applied to a machine tool requiring machining of a capacity equal to or higher than that achievable by one unit of hardware, by further adding an NC apparatus, a machine operator can perform co-operation machining (synchronous control machining) and the like as if control is performed by using one NC apparatus, without being conscious about a fact that control is being performed by plural NC apparatuses.

Because multi-axis system control of high function can be achieved by using low-cost hardware even when performance of individual NC apparatus is low, it becomes sufficient to consolidate NC apparatuses of which function is optimum for general machines. It becomes unnecessary to develop a multi-axis/multi-system NC apparatus having excess specification for general machines of which all specifications can be covered by one unit of NC apparatus. As a result, its development cost and manufacturing cost can be reduced.

Control timings of axes extending between NC apparatuses can be matched, and further, synchronization control of axes extending between NC apparatuses can be performed in high precision.

Even when main axes of which speed is instructed in each system are coupled to separate NC apparatuses, a machine operator can perform switching of control systems of the main axes, speed control of the main axes, steady control of circumferential velocity synchronous with coordinate values of linear axes or rotation axes of each system, and feed per revolution and thread cutting synchronous with rotations of the main axes, as if control is being performed by one NC apparatus, without being conscious about NC apparatuses to which the main axes are coupled.

Even when linear axes or rotation axes of which position is instructed in each system are coupled to separate NC apparatuses, a machine operator can perform switching of control systems of the linear axes or the rotation axes, positioning, and interpolation of shift instructions combining axes of different NC apparatuses, as if control is being performed by one NC apparatus, without being conscious about NC apparatuses coupling the linear axes or the rotation axes.

Even when main axes of which speed is instructed in each system are coupled to separate NC apparatuses, and also even when linear axes or rotation axes of which position is instructed in each system are coupled to separate NC apparatuses, a machine operator can perform switching of control systems of the main axes, speed control of the main axes, steady control of circumferential velocity synchronous with coordinate values of linear axes or rotation axes of each system, and feed per revolution and thread cutting synchronous with rotations of the main axes, and can perform switching of control systems of the linear axes or the rotation axes, positioning, and interpolation of shift instructions combining axes of different NC apparatuses, as if control is being performed by one NC apparatus, without being conscious about NC apparatuses to which the main axes are coupled and NC apparatuses coupling the linear axes or the rotation axes.

BRIEF DESCRIPTION OF DRAWINGS

FIG. 1 is a block diagram of a configuration of relevant parts of an NC system according to a first embodiment of the present invention.

FIG. 2 is an axis configuration example of the NC system according to the first embodiment of the present invention.

FIG. 3 depicts setting examples of a virtual axis and an external-switching effective axis in the NC system according to the first embodiment of the present invention.

FIG. 14 is an axis configuration example of the NC system according to the second embodiment of the present invention.

FIG. 15 depicts setting examples of a virtual axis and an external-switching effective axis in the NC system according to the second embodiment of the present invention.

FIG. 16 is a program example of the NC system according to the second embodiment of the present invention.

FIG. 21 is a configuration example of a system and axis of the machine tool according to the third embodiment of the present invention that applies the NC system according to the present invention, in a first cycle of machining.

FIG. 22 is a configuration example of a system and axis of the machine tool according to the third embodiment of the present invention that applies the NC system according to the present invention, in a second cycle of machining.

FIG. 23 is a configuration example of a system and axis of the machine tool according to the third embodiment of the present invention that applies the NC system according to the present invention, in a third cycle of machining.

FIG. 24 is a configuration example of a system and axis of the machine tool according to the third embodiment of the present invention that applies the NC system according to the present invention, in a fourth cycle of machining.

FIG. 25 is a configuration example of a system and axis of the machine tool according to the third embodiment of the present invention that applies the NC system according to the present invention, in a fifth cycle of machining.

Figures 4, 5:
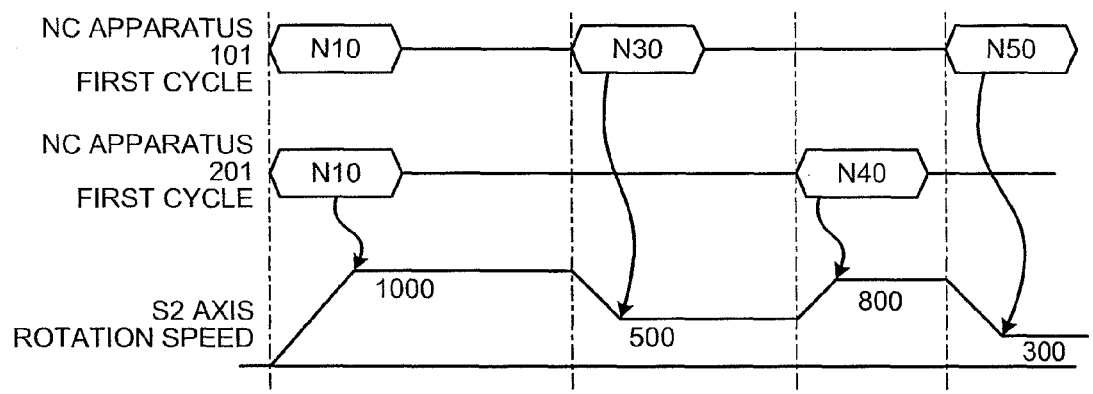
FIG. 4 is a program example of the NC system according to the first embodiment of the present invention.
FIG. 5 is an operation example with respect to the program example in FIG. 4.

EXPLANATIONS OF LETTERS OR NUMERALS 101, 201 NC apparatus
102, 103, 108, 109, 202, 203, 208, 210 servo control unit
104, 204 main-axis control unit
105, 106, 110, 111, 205, 206, 209, 211 servomotor
107, 207 main-axis motor
111, 112, 211, 212 analysis processing unit
120, 220 interpolation control unit
121, 221 PLC control unit
122, 222 axis exchange control unit
123, 223 axis control unit
130 display device
140, 240 NC program
141, 142, 241 NC program
151, 251 virtual axis control unit
152, 252 delay control unit
153, 253 external communicating unit
154, 254 axis-control-right switch processing unit 254
155, 255 virtual-axis setting unit
156, 256 external-switching-axis setting unit

BEST MODE(S) FOR CARRYING OUT THE INVENTION

First Embodiment

A first embodiment of the present invention is explained below with reference to FIG. 1 to FIG. 11. The first embodiment is an application example of the present invention to a machining line having two NC lathes arranged thereon.

FIG. 1 a block diagram of a configuration of relevant parts of an NC system according to the first embodiment of the present invention. Reference numerals 101 and 201 denote an NC apparatus having a separate CPU and each independently controllable. The NC apparatus 101 is mounted on one NC lathe, and the NC apparatus 201 is mounted on the other NC lathe.

Reference numerals 102 and 103 denote a servo control unit of control axes coupled to the NC apparatus 101, and reference numeral 104 denotes a main-axis control unit coupled to the NC apparatus 101. Reference numerals 105 and 106 denote a servomotor driven by the servo control units 102 and 103, and these servomotors have position detectors that feedback position information to the NC apparatus 101.

Reference numeral 107 denotes a main-axis motor driven by the main-axis control unit 104. A position detector that feeds back position information to the NC apparatus 101 is provided in a main axis controlled by the main-axis control unit. Reference numerals 202, 203, and 208 denote a servo control unit of control axes coupled to the NC apparatus 201, and 204 denotes the main-axis control unit coupled to the NC apparatus 201. Reference numerals 205, 206, and 209 denote a servomotor driven by the servo control units 202, 203, and 208, and these servomotors have position detectors that feed back position information to the NC apparatus 201. Reference numeral 207 denotes the main-axis motor driven by the main-axis control unit 204.

A position detector that feeds back position information to the NC apparatus 201 is provided in a main axis driven by the main-axis motor.

Position information fed back to an axis control unit 223 of the NC apparatus 201 is also fed back to the interpolation control unit 120 of the NC apparatus 101.

The display device 130 shared by the NC apparatus 101 and the NC apparatus 201 has a display screen and a keyboard, and is a known device.

The NC apparatuses 101 and 201 have a known hardware configuration including a CPU, a memory or the like, and are mounted with a processing unit, a control unit, a setting unit or the like configured by software explained below.

The NC apparatus 101 includes the analysis processing unit 111, the interpolation control unit 120, the PLC control unit 121, and the axis control unit 123.

The NC apparatus 201 includes an analysis processing unit 211, an interpolation control unit 220, a PLC control unit 221, and the axis control unit 223. The analysis processing unit 111 of the NC apparatus 101 reads each one block of an NC program stored in a memory (not shown), and analyzes the program to perform an interpolation process and the like. The interpolation control unit 120 receives a result of analysis of the analysis processing unit 111, and performs an interpolation process at each predetermined time based on feedback data (position information and the like detected by a detector of the main axis) from the NC apparatus 201 transmitted through the axis control unit 223, an external communicating unit 253, an external communicating unit 153, and a virtual axis control unit 151. When a virtual axis is set to a control axis (for example, a main axis controlled by the main-axis motor 207) coupled to the NC apparatus 201, this interpolation control unit 120 also performs an interpolation process of this virtual axis. As a result of the interpolation process, a shift amount per interpolation unit of each control axis is generated. The axis control unit 123 outputs a shift amount per unit cycle after performing acceleration and deceleration of each control axis, to the servo control units 102 and 103 and the main-axis control unit 104 that are coupled. The servo control units 102 and 103 and the main-axis control unit 104 drive the coupled motors 105 to 107 following the instructed shift amount.

The analysis processing unit 211 of the NC apparatus 201 reads each one block of an NC program stored in a memory (not shown), and analyzes the program to perform an interpolation process and the like. The interpolation control unit 220 receives a result of analysis from the analysis processing unit 211, and performs an interpolation process at each predetermined time. As a result of the interpolation process, a shift amount per interpolation unit of each control axis is generated. The axis control unit 223 outputs a shift amount per unit cycle after performing acceleration and deceleration of each control axis, to the servo control units 202, 203, and 208 and the main-axis control unit 204 that are coupled. The servo control units 202, 203, and 208 and the main-axis control unit 204 drive the coupled motors 205 to 207, and 209 following the instructed shift amount.

A detailed function of the interpolation control unit 120 is described later with reference to FIGS. 6, 9, and 10.

The PLC control units 121 and 221 process auxiliary instructions (M instructions) instructed by the NC program, and are a known device. Therefore, explanations thereof will be omitted.

Further, the NC apparatus 101 includes the virtual axis control unit 151, the external communicating unit 153, and a virtual-axis setting unit 155. The NC apparatus 201 includes the external communicating unit 253, an axis-control-right switch processing unit 254, and an external-switching-axis setting unit 256.

The virtual axis control unit 151 included in the NC apparatus 101 is provided to control axes other than axes that the axis control unit 123 of the NC apparatus 101 can control out of control axes interpolated by the interpolation control unit 120. The virtual axis control unit 151 controls virtual-axes set by the virtual-axis setting unit 155. In the NC system shown in FIG. 1, when a main axis controlled by the main-axis motor 207 coupled to the NC apparatus 201 is set as a virtual axis, for example, the virtual axis control unit 151 controls the main-axis motor 207.

That is, the virtual axis control unit 151 transmits an instruction position (a shift amount per unit cycle after performing acceleration and deceleration and the like of a virtual axis) of a virtual axis set by the virtual-axis setting unit 155 interpolated by the interpolation control unit 120, to the axis control unit 223 of the NC apparatus 201 via the external communicating unit 153 and the external communicating unit 253.

The external communicating unit 153 is coupled to the external communicating unit 253 of the NC apparatus 201 by a communication path of bidirectional serial communication, Ethernet® or a bus, and both external communicating units communicate with each other at every constant cycle. Therefore, an instruction position (a shift amount per unit cycle after performing acceleration and deceleration and the like of a virtual axis) transmitted by the virtual axis control unit 151 can be transmitted to the axis control unit 223 of the NC apparatus 201 via the external communicating units 153 and 253. Further, position information fed back to the NC apparatus 201 can be transmitted to the interpolation control unit 120 of the NC apparatus 101 through the axis control unit 223, the external communicating units 253 and 153, and the virtual axis control unit 151.

The axis-control-right switch processing unit 254 included in the NC apparatus 201 switches a control right of a control axis set as an external-switching effective axis in the external-switching-axis setting unit 256 of the NC apparatus 201 out of axes controllable by the axis control unit 223, to either shift an axis following an interpolation shift amount generated as a result of an interpolation process of the interpolation control unit 220 included in the NC apparatus 201, or receive via the external communicating unit 253 an interpolation shift amount to a virtual control axis generated as a result of an interpolation process of the interpolation control unit 120 included in the NC apparatus 101 at the outside and shift an axis following the received interpolation shift amount. The axis-control-right switch processing unit 254 switches the control right following priority based on an instruction of a machining program operated by the NC apparatus 101 at the outside or an instruction of a machining program operated by the NC apparatus 201.

The control right can be also switched by a signal from the PLC control unit 221.

Functions of the virtual-axis setting unit 155 and the external-switching-axis setting unit 256 are described later with reference to FIG. 3.

FIG. 2 is an axis configuration example of the NC system according to the first embodiment of the present invention. Because the NC apparatus 101 and the NC apparatus 201 operate based on separate CPUs, the respective NC apparatuses independently operate following separate NC programs in each control system. The NC apparatus 101 and the NC apparatus 201 are coupled to each other by the external communicating unit 153 and the external communicating unit 253.

In this example, the NC apparatus 101 has a one-system configuration having the X1 axis, the Z1 axis, and the S1 axis (main axis) coupled to this apparatus. By an NC program 140 performed by a first system of the NC apparatus 101, the X1 axis, the Z1 axis, and the S1 axis can be program-instructed at addresses of X, Z, and S, respectively. The NC apparatus 201 has a one-system configuration having the X2 axis, the Z2 axis, a Y2 axis, and the S2 axis (main axis) coupled to this apparatus. By an NC program 240 performed by a first system of the NC apparatus 201, the X2 axis, the Z2 axis, the Y2 axis, and the S2 axis can be program-instructed at addresses of X, Z, Y, and S, respectively.

In the NC apparatus 101, a virtual main axis (the S2 axis) is further set that gives an instruction at the S address by switching a control main axis by a G code (a G44 instruction, for example) or gives an instruction by an exclusive S instruction (S2=), in addition to the axis configuration in which the X1 axis, the Z1 axis, and the S1 axis coupled to the NC apparatus 101 can be instructed at the addresses of the X, Z, and S of the NC program 140.

FIG. 3 depicts setting examples of a virtual axis and an external-switching effective axis in the NC system having the axis configuration as shown in FIG. 2. In the NC apparatus 101, the virtual-axis setting unit 155 sets the X1 axis, the Z1 axis, and the S1 axis as axes of servo control units or main-axis control units of a 01 station, a 02 station, a 03 station coupled to the NC apparatus 101. The virtual-axis setting unit 155 allocates the S2 axis as a virtual axis to a virtual-axis output station V01 of the NC apparatus 101, and sets an interpolation-output shift amount to the S2 axis of the NC apparatus 101 to be transmitted to an input station P01 of M02 indicating the NC apparatus 201.

On the other hand, in the NC apparatus 201, the external-switching-axis setting unit 256 sets the X2 axis, the Z2 axis, the Y2 axis, and the S2 axis as axes of servo control units or main-axis control units of the 01 station, the 02 station, the 03 station, a 04 station coupled to the NC apparatus 201. The external-switching-axis setting unit 256 sets the S2 axis as an external-switching effective axis controlled following an interpolation output received by the input station P01 when the input station P01 is selected. The input station P01 is set to communicate to the output station V01 indicating the NC apparatus 101.

The above setting is performed before machine operation, and the display device 130 displays a setting screen as shown in FIG. 3. An operator inputs from a keyboard of the NC apparatuses 101 and 201 to perform the setting.

Contents of the setting can be described at the header of each NC program, and the setting units 155 and 256 can perform the setting at the time of reading each NC program.

Figure 6:
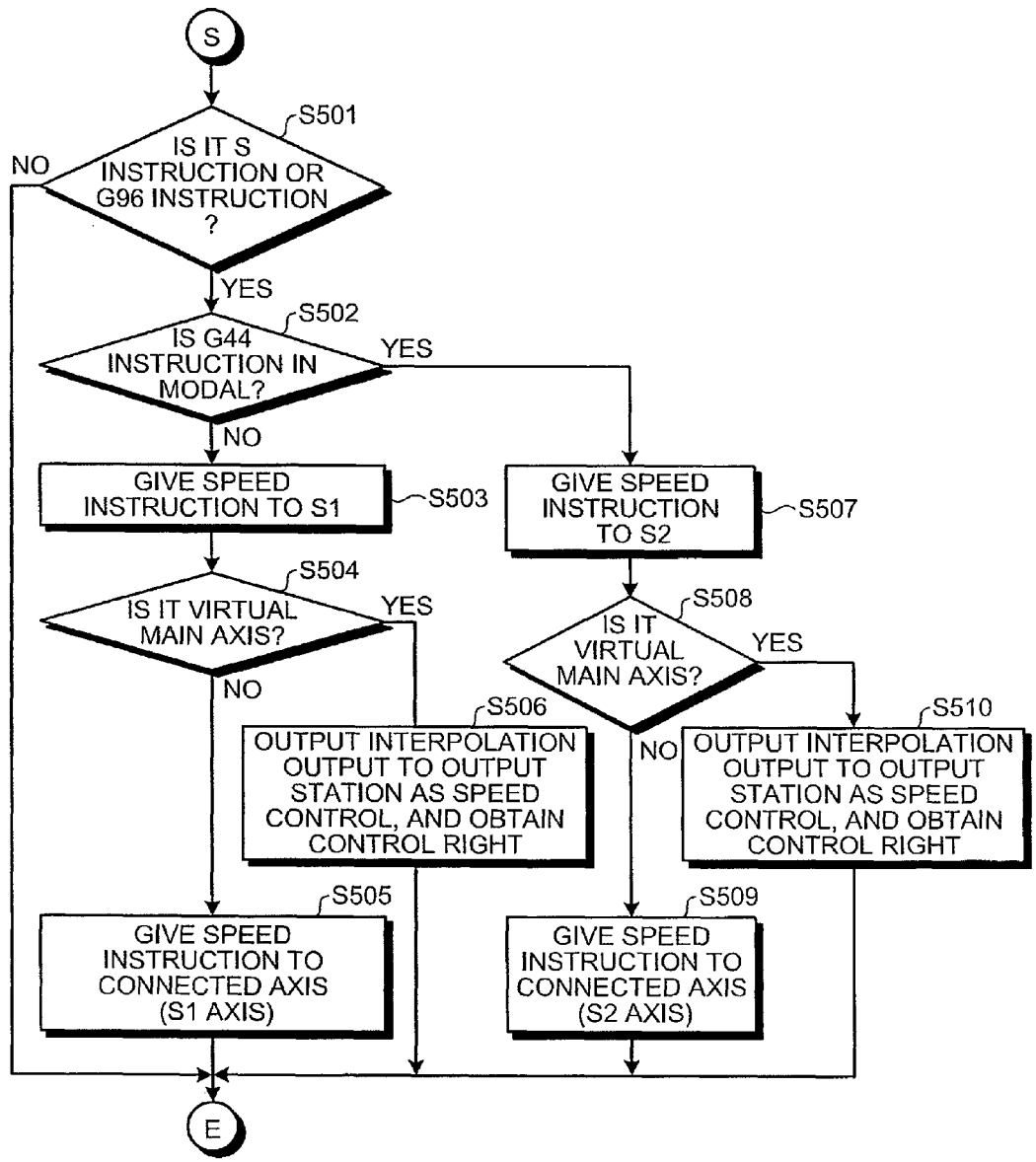
FIG. 6 is a flowchart of an operation of an interpolation control unit in the NC system according to the first embodiment of the present invention when an instruction to a main axis is made.

FIG. 6 is a flowchart of selection of a main axis of an interpolation control unit when an instruction to a main axis is made by an NC program as shown in FIG. 4.

That is, at Step S501, it is determined whether an instruction is an S instruction block or a G96 instruction (a circumferential-velocity-constant control instruction) block, that is, whether this is an instruction to a main axis. When this is not an instruction block to a main axis, process is finished. When this is an instruction block to a main axis, it is determined at Step S502 whether the G44 instruction (a selection instruction of a main axis set as a virtual axis) is in modal.

When the G44 instruction is not in modal, it is determined that the S1 axis is being selected (Step S503). At Step S504, it is determined from setting information of a virtual-axis setting unit whether the S1 axis is a virtual main axis. When the S1 axis is not a virtual main axis, it is determined that the S1 axis is a connection axis of an NC apparatus to which this interpolation control unit belongs, and a speed instruction is output to an axial control unit at Step S505. When it is determined at Step S504 that the S1 axis is a virtual main axis, an interpolation output from speed control of the S1 axis is output to the virtual axis control unit at Step S506. As described later, in the virtual axis control unit, the output is made to an output station registered in the S1 axis, and the corresponding NC apparatus obtains a control right.

At Step S502, when the G44 instruction is in modal, it is determined that the S2 axis is being selected (Step S507). At Step S508, it is determined from setting information of the virtual-axis setting unit whether the S2 axis is a virtual main axis. When the S2 axis is not a virtual main axis, it is determined that the S2 axis is a connection axis of an NC apparatus to which this interpolation control unit belongs, and a speed instruction is output to an axis control unit at Step S509. When it is determined at Step S508 that the S2 axis is a virtual main axis, an interpolation output from speed control of the S2 axis is output to the virtual axis control unit at Step S510. As described later, in the virtual axis control unit, the output is made to an output station registered in the S2 axis, and the corresponding NC apparatus obtains a control right.

In this flow, when the virtual axis and the external-switching effective axis shown in FIG. 3 are set in the axis configuration shown in FIG. 2, it is determined at Step S504 that the S1 is not a virtual main axis, and the process proceeds to Step S505. It is determined at Step S508 that the S2 is a virtual main axis, and the process proceeds to Step S510.

Figure 7:
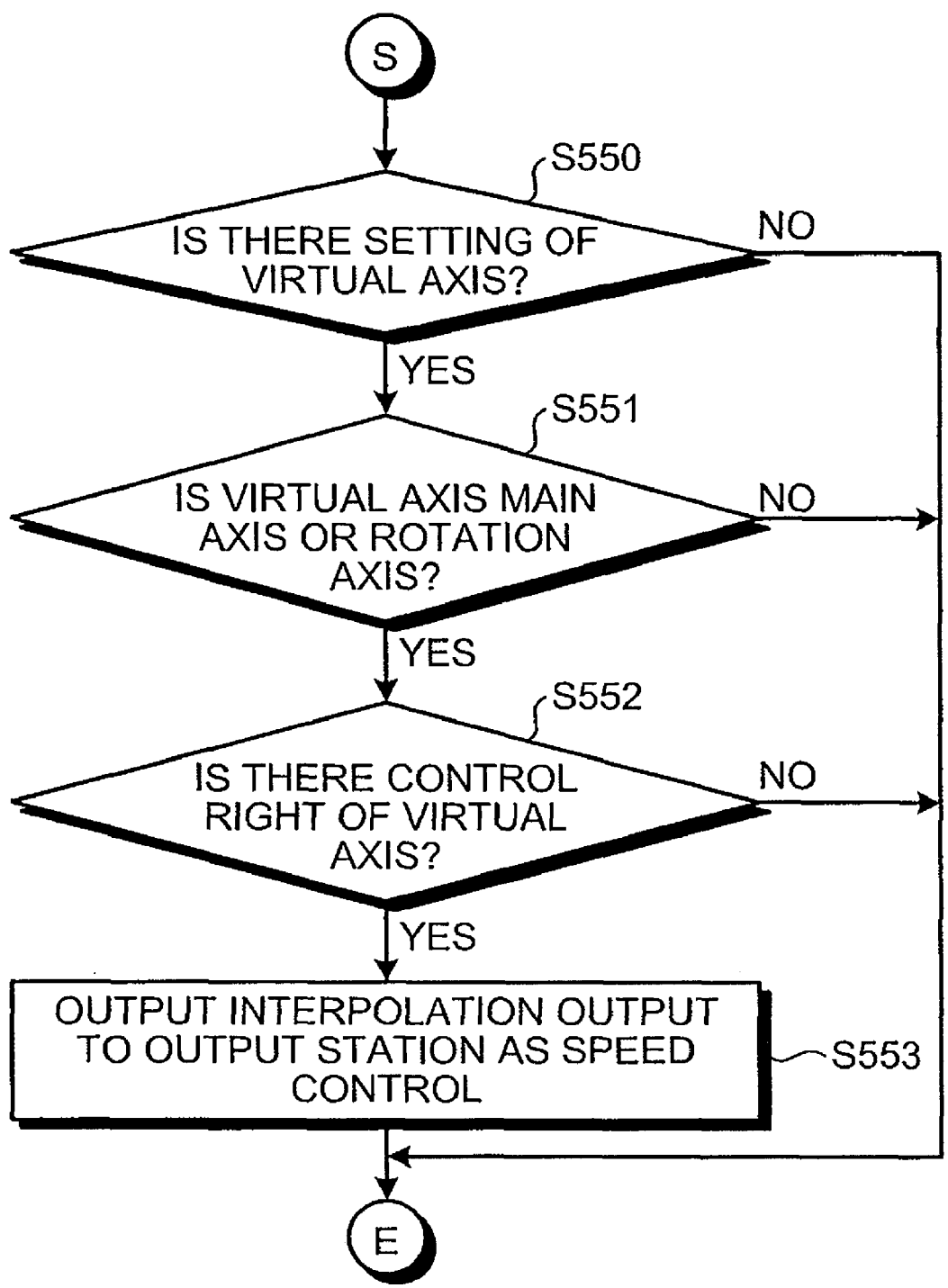
FIG. 7 is a flowchart of an interpolation output operation with respect to a virtual axis in a virtual axis control unit in the NC system according to the first embodiment of the present invention.

FIG. 7 is a flowchart of a speed-control interpolation output to a virtual axis in the virtual axis control unit 151. At Step S550, it is determined whether this is a setting of a virtual axis. When this is a setting of a virtual axis, at Step S551, it is determined whether the virtual axis is a main axis or a rotation axis (an A axis, a B axis, and a C axis around linear axes of the X axis, the Y axis, and the Z axis). When the virtual axis is a main axis or a rotation axis, it is determined at Step S552 whether there is a control right of the virtual axis. When there is a control right, at Step S553, an interpolation result of speed control of this virtual axis is output to an output station set in the virtual axis.

Figure 8:
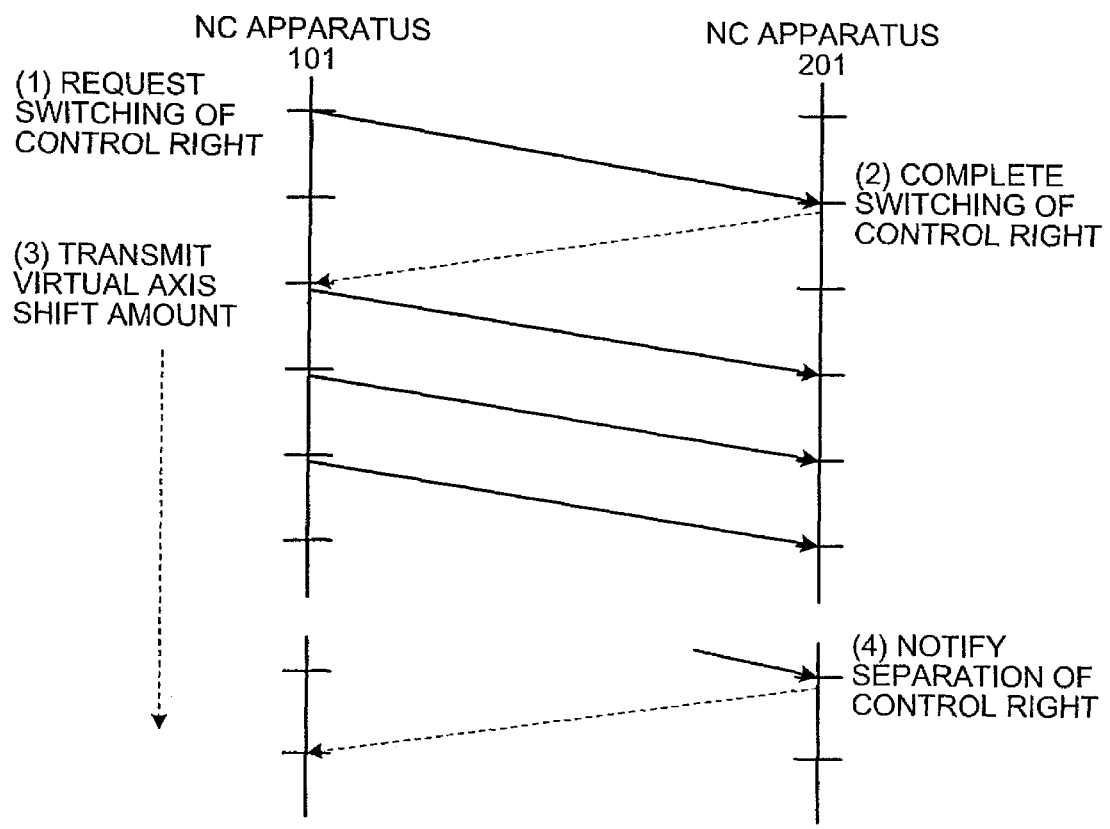
FIG. 8 depicts a communication sequence of switching of a control right of a control axis in the NC system according to the first embodiment of the present invention.

When selection instruction of the S2 axis set as a virtual axis in the NC apparatus 101 is made from the NC program 140, the virtual axis control unit 151 makes a switching request of the control right to the axis-control-right switch processing unit 254 via the external communicating unit 153 and the external communicating unit 253. The axis-control-right switch processing unit 254 switches the control right of the S2 axis to an instruction of the external input station P01, thereby giving the control right to the NC apparatus 101. FIG. 8 depicts a communication sequence of switching of a control right of the S2 axis between the NC apparatus 101 and the NC apparatus 201.

That is, as shown in FIG. 8, when a selection instruction of the S2 axis set as a virtual axis in the NC apparatus 101 and coupled to the NC apparatus 201 is performed, a switching request of a control right of the S2 axis is transmitted from the NC apparatus 101 to the NC apparatus 201 via an external communicating unit.

Next, the NC apparatus 201 switches the control right of the S2 axis as the external-switching effective axis to the input station P01, and notifies completion of switching of the control right to the NC apparatus 101.

Thereafter, the NC apparatus 101 transmits a shift amount to the NC apparatus 201 following a predetermined communication cycle following an instruction to the virtual axis S2 axis.

When the NC apparatus 201 switches the control right of the S2 axis, and also when the control right is switched to a separate NC apparatus, the NC apparatus 201 notifies to the NC apparatus 101 that the control right is separated.

Regardless of the above communication sequence, the NC apparatus 201 transmits feedback position information of the S2 axis to the NC apparatus 101. The NC apparatus 101 instructs feed per revolution and instructs thread cutting in the S2 axis, following received feedback position information.

When the NC program shown in FIG. 4 is performed in the NC system set as shown in FIG. 3 in the axis configuration shown in FIG. 2, that is, when the NC program 140 is operated in the first system of the NC apparatus 101 and when the NC program 240 is operated in the first system of the NC apparatus 201, the S2 axis coupled to the NC apparatus 201 and set as a virtual axis operates as shown in FIG. 5.

That is, the NC program 240 is operated in the first system of the NC apparatus 201, a speed instruction of 1000 r/min is given to the S2 axis, and rotation is performed at the same speed.

A selection instruction of the S2 axis set in the NC apparatus 101 as a virtual axis is made by the G44 instruction in an N30 block of the NC program 140 operated in the first system of the NC apparatus 101, and a speed instruction of 500 r/min is given by an S500 instruction. In this case, the axis-control-right switch processing unit 254 of the NC apparatus 201 determines priority in the order of switching requests, and switches the control right of the S2 axis to an instruction of the NC apparatus 101. The S2 axis rotates at 500 r/min of a speed instruction given by the NC apparatus 101. The Z1 axis shifts at feed per-revolution speed of 1 millimeter per one rotation for a rotation speed of the S2 axis by an N31 block (G95: a feed per-revolution instruction (a cutting feed instruction to instruct how much a tool is to be fed per one rotation of a main axis)), thereby performing a cutting. The feed per-revolution instruction is a kind of synchronization control.

Next, a selection instruction of the S2 axis in the first system of the NC apparatus 201 is made by a G43 instruction by an N40 block of the NC program 240 operated in the first system of the NC apparatus 201, and a speed instruction of 800 r/min is given. The axis-control-right switch processing unit 254 of the NC apparatus 201 switches the control right of the S2 axis to a speed instruction given by the NC apparatus 201. The S2 axis rotates at 800 r/min of a speed instruction given by the NC apparatus 201.

In an N50 block of the NC program 140 operated in the first system of the NC apparatus 101, a speed instruction of 300 r/min is given to the S2 axis. A selection instruction of the S2 axis set as a virtual axis in the NC apparatus is made. The NC apparatus 201 switches the control right of the S2 axis to an instruction of the NC apparatus 101. The S2 axis rotates at 300 r/min of a speed instruction given by the NC apparatus 101. When a machine configuration is such that the X1 axis and the Z1 axis coupled to the NC apparatus 101 drive a tool table to which a thread cutting bite is fixed and the S2 axis coupled to the NC apparatus 201 drives a main axis that rotates a workpiece, a thread cutting process of 0.5-millimeter pitch is performed to a rotation speed of the S2 axis by an N51 block (G33: a thread cutting instruction). The thread cutting instruction is also a kind of synchronization control.

Figure 9:
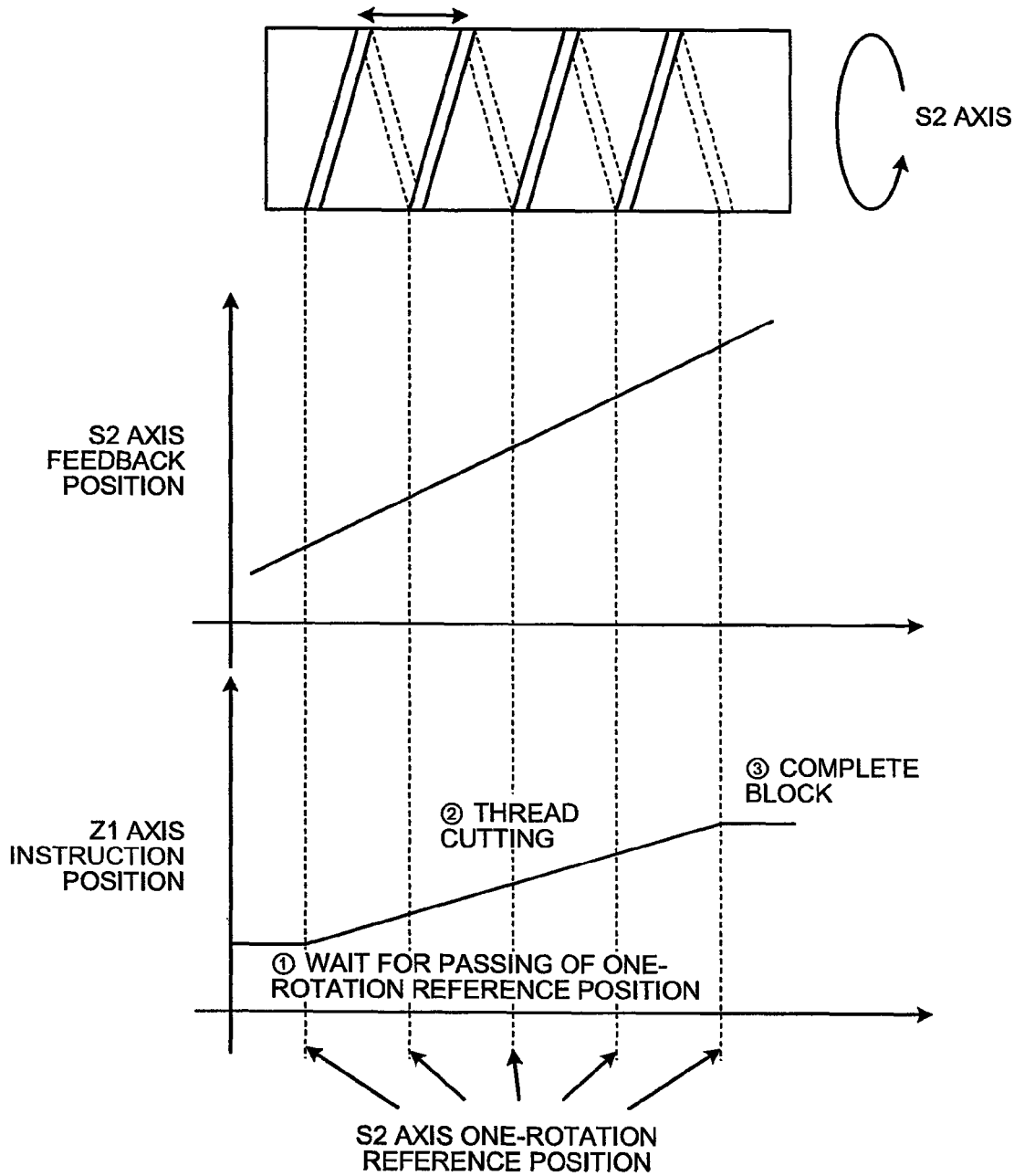
FIG. 9 is an explanatory diagram of an operation of the interpolation control unit in the NC system according to the first embodiment of the present invention, depicting a feedback position of an S2 axis and an instruction position of a Z1 axis.
Figure 10:
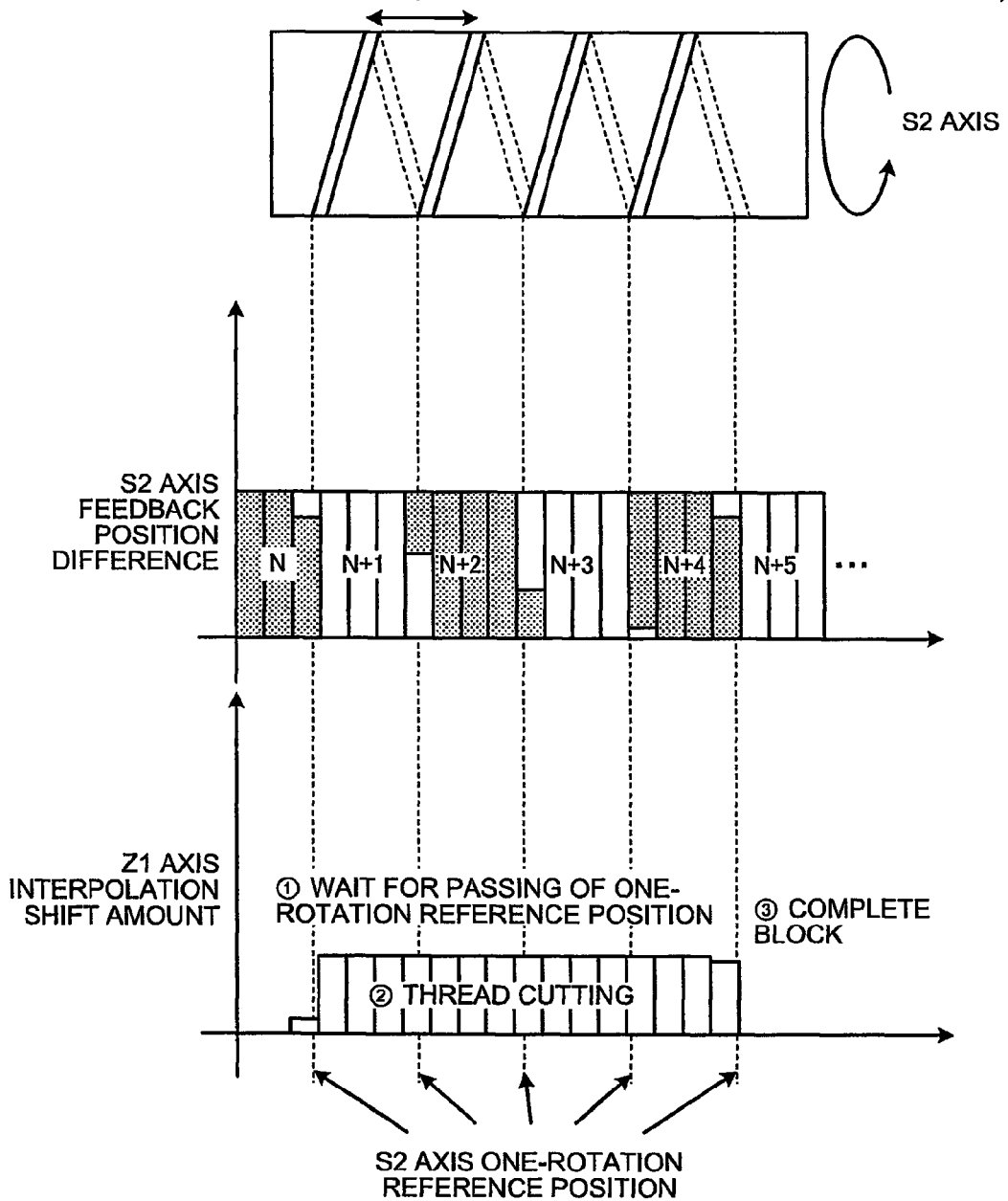
FIG. 10 is an explanatory diagram of an operation of the interpolation control unit in the NC system according to the first embodiment of the present invention, depicting a feedback position difference of the S2 axis and an interpolation shift amount of the Z1 axis.

At the time of this thread cutting process, the present NC system operates as shown in FIG. 9 and FIG. 10. FIG. 9 depicts a feedback position of the S2 axis and an instruction position of the Z1 axis. FIG. 10 depicts a feedback position difference of the S2 axis and an interpolation shift amount of the Z1 axis.

That is, the interpolation control unit 120 of the NC apparatus 101 detects occurrence of a change extending to a predetermined angle position (one-rotation reference position) from feedback position data of the S2 axis fed back from the NC apparatus 201 through the axis control unit 223, the external communicating unit 253, the external communicating unit 153, and the virtual axis control unit 151 after a thread cutting instruction is made, and waits for a passing of the S2 axis by the predetermined angle position. When that the S2 axis passes the one-rotation reference position is detected, the interpolation control unit 120 calculates a feedback-position change amount ($\Delta P$) from the one-rotation reference position, and calculates a first Z1-axis shift amount. The interpolation control unit 120 calculates a shift amount of the Z1 axis (a thread-cutting lead axis) for a change amount of feedback position data up to final coordinates of the thread cutting instruction, thereby calculating a shift amount of the Z1 axis.

When a thread pitch is P[mm], and also when a change amount of feedback position data per cycle $\Delta Ts$[ms] that the NC apparatus 101 receives feedback position data of the S2 axis is $\Delta P$[degree], an interpolation shift amount of the thread-cutting lead axis (the Z1 axis) per interpolation unit time $\Delta Ti$[ms] can be calculated by the following equation.

$$(Z1\text{-axis interpolation shift amount}) = P \times (\Delta Ti/\Delta Ts) \times P/360$$

For example, assume that an interpolation processing cycle ($\Delta Ti$) of the NC apparatus 101 is 4 milliseconds, a cycle ($\Delta Ts$) that the NC apparatus 101 and the NC apparatus 201 communicate with each other and the NC apparatus 101 receives feedback position data from the NC apparatus 201 is 8 milliseconds, and the S2 axis rotates at 300 r/min and performs a thread cutting at a pitch 0.5 millimeter. In this case, when a value of the feedback position data of the S2 axis is updated at each $\Delta Ts$ (8 milliseconds) cycle, and when a change amount $\Delta P$ is 19 degrees, an interpolation shift amount per interpolation processing cycle ($\Delta Ti$) of the Z1 axis is calculated as $$(Z1\text{-axis interpolation shift amount}) = 0.5 \text{ [mm]} \times (4/8) \times 19 \text{ [degrees]}/360 = 0.013 \text{ mm}.$$

This interpolation shift amount is output. In the above calculation, it is needless to mention that a fraction in a calculated shift amount needs to be rounded. By calculating the above interpolation shift amount, the Z1 axis coupled to the NC apparatus 101 performs interpolation shift of 0.5 millimeter and performs thread cutting each time when the S2 axis coupled to the NC apparatus 201 makes one rotation.

Figure 11:
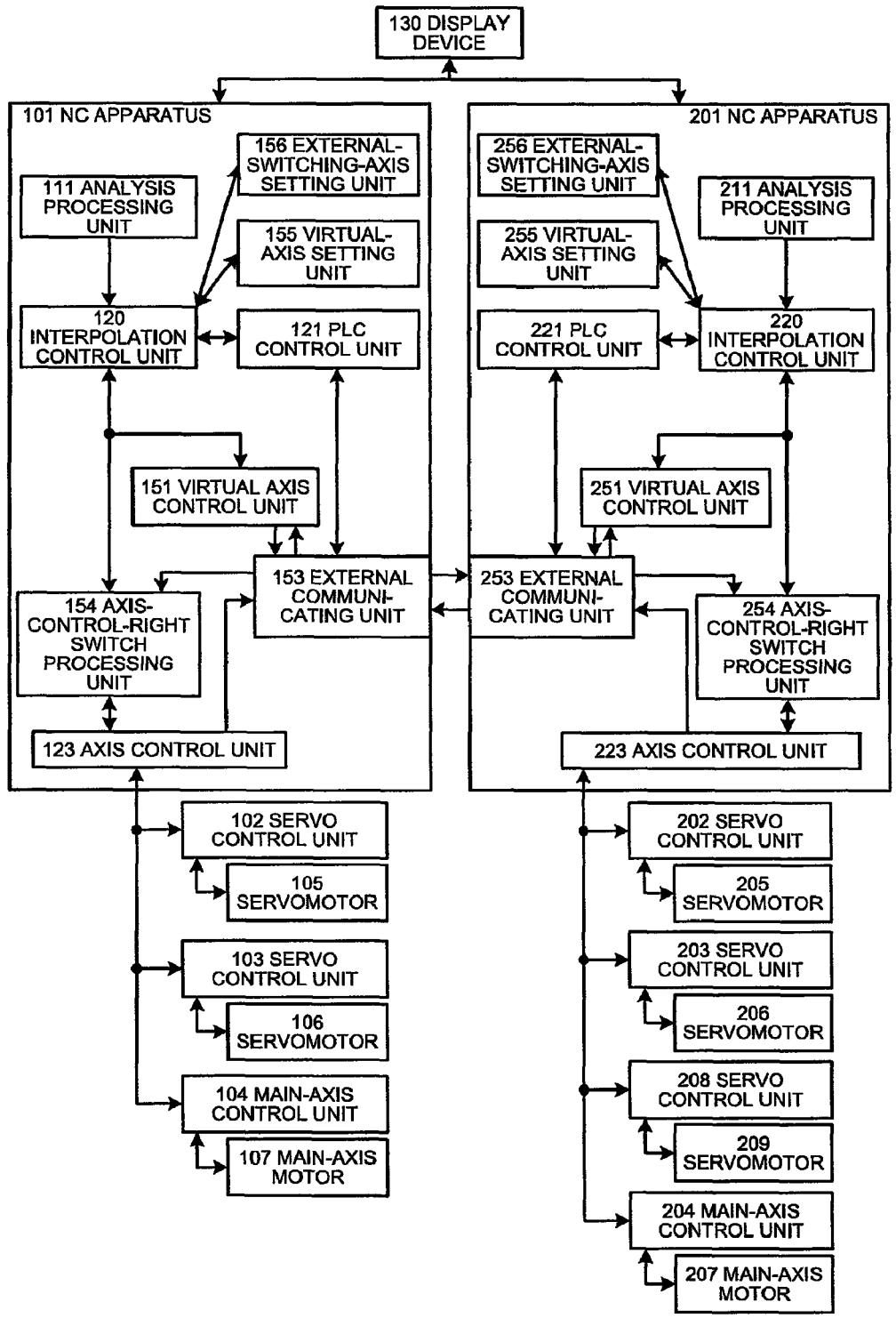
FIG. 11 is a block diagram of relevant parts of a modification example of the NC system according to the first embodiment of the present invention.

While not described in the example of FIG. 1, as shown in FIG. 11, the NC apparatus 101 can be configured to include an axis-control-right switch processing unit 154 and an external-switching-axis setting unit 156 having substantially the same functions as those of the axis-control-right switch processing unit 254 and the external-switching-axis setting unit 256 of the NC apparatus 201, and the NC apparatus 201 can be configured to include a virtual axis control unit 251 and a virtual-axis setting unit 255 having substantially the same functions as those of the virtual axis control unit 151 and the virtual-axis setting unit 155 of the NC apparatus 101.

That is, the NC apparatus 101 and the NC apparatus 201 can have the same configuration.

When the configurations shown in FIG. 11 are provided, an instruction position that the virtual axis control unit 151 transmits can be transmitted to the axis control unit 223 of the NC apparatus 201 via the external communicating units 153 and 253, and at the same time, position information fed back to the NC apparatus 101 can be transmitted to the interpolation control unit 220 of the NC apparatus 201 through the axis control unit 123, the external communicating units 153 and 253, and the virtual axis control unit 251. An instruction position that the virtual axis control unit 251 transmits can be transmitted to the axis control unit 123 of the NC apparatus 101 via the external communicating units 253 and 153, and at the same time, position information fed back to the NC apparatus 201 can be transmitted to the interpolation control unit 120 of the NC apparatus 101 through the axis control unit 223, the external communicating units 253 and 153, and the virtual axis control unit 151.

When the virtual-axis setting unit 255 of the NC apparatus 201 sets a predetermined axis (for example, an axis controlled by the main-axis motor 107) coupled to the NC apparatus 101 as a virtual axis, and also when the external-switching-axis setting unit 156 of the NC apparatus 101 sets a predetermined axis (for example, an axis controlled by the main-axis motor 107) coupled to the NC apparatus 101 set as the virtual axis, as an external-switching effective axis in the external-switching-axis setting unit 156, the NC apparatus 201 can control the predetermined axis coupled to the NC apparatus 101 synchronously with the axis coupled to the NC apparatus 201.

As explained above, according to the first embodiment, when the invention is applied to a machine tool requiring machining of a capacity equal to or higher than that achievable by one unit of hardware, by further adding an NC apparatus, a machine operator can perform co-operation machining (synchronous control machining) and the like as if control is performed by using one NC apparatus, without being conscious about a fact that control is being performed by plural NC apparatuses.

Because multi-axis system control of high function can be achieved by using low-cost hardware even when performance of individual NC apparatus is low, it becomes sufficient to consolidate NC apparatuses of which function is optimum for general machines. It becomes unnecessary to develop a multi-axis/multi-system NC apparatus having excess specification for general machines of which all specifications can be covered by one unit of NC apparatus. As a result, its development cost and manufacturing cost can be reduced.

Even when main axes of which speed is instructed in each system are coupled to separate NC apparatuses, a machine operator can perform switching of control systems of the main axes, speed control, steady control of circumferential velocity synchronous with coordinate values of linear axes or rotation axes of each system, and feed per revolution and thread cutting synchronous with rotations of the main axes, as if control is being performed by one NC apparatus, without being conscious about NC apparatuses to which the main axes are coupled.

Second Embodiment

A second embodiment of the present invention is explained below with reference to FIG. 12 to FIG. 18. The second embodiment is an application example of the present invention to a machining line having two NC lathes arranged thereon.

Figure 12:
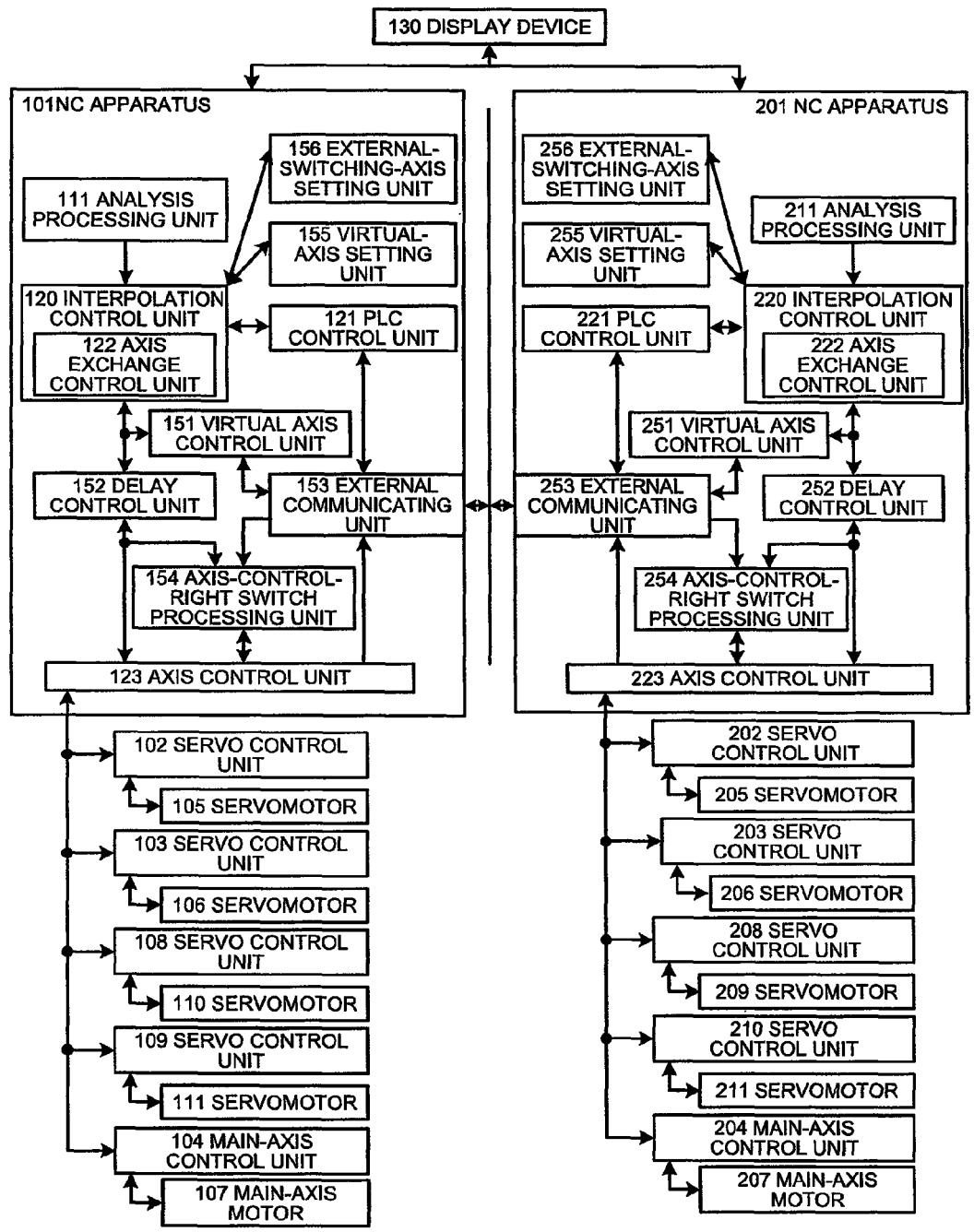
FIG. 12 is a block diagram of a configuration of relevant parts of an NC system according to a second embodiment of the present invention.
Figure 13:
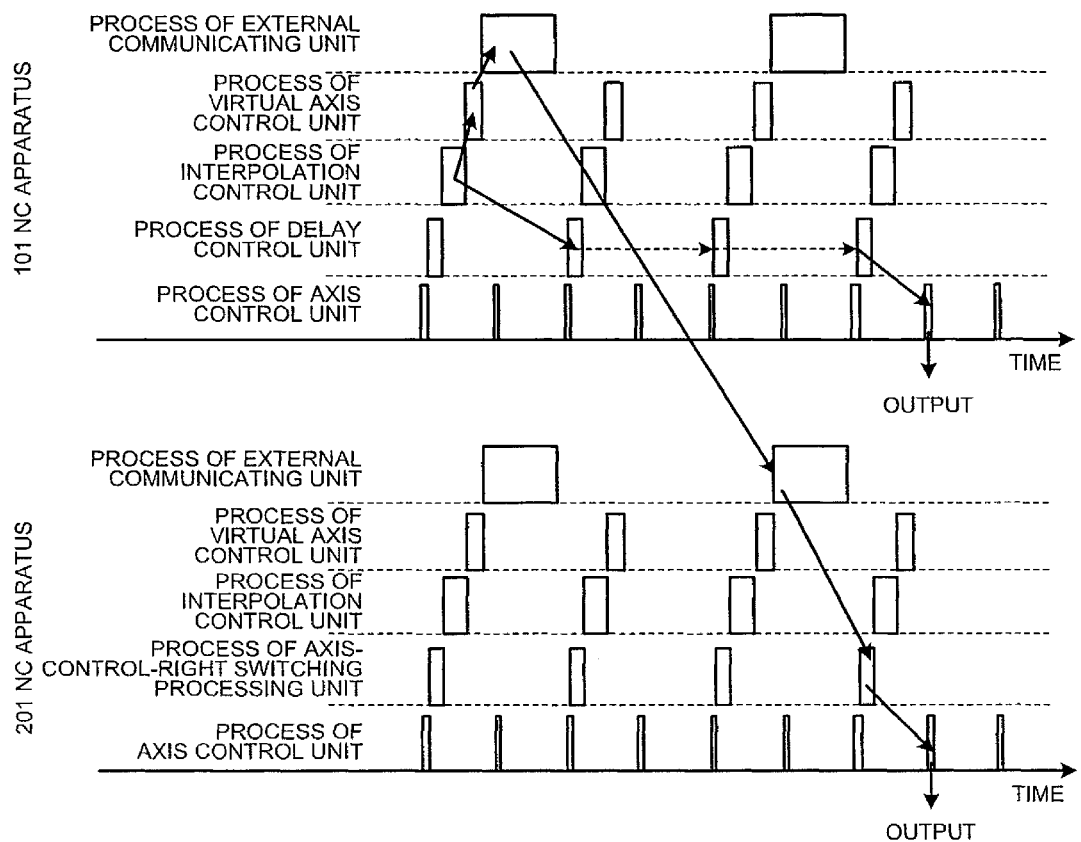
FIG. 13 is a time chart of the NC system according to the second embodiment of the present invention.

FIG. 12 is a block diagram of a configuration of relevant parts an NC system according to the second embodiment of the present invention. Reference numerals 101 and 201 denote the NC apparatus having a separate CPU and each independently controllable. The NC apparatus 101 is mounted on one NC lathe, and the NC apparatus 201 is mounted on the other NC lathe.

Reference numerals 102, 103, 108, and 109 denote the servo control unit of control axes coupled to the NC apparatus 101, and 104 denotes the main-axis control unit coupled to the NC apparatus 101. Reference numerals 105, 106, 110, and 111 denote the servomotor driven by the servo control units 102, 103, 108, and 109 and these servomotors have position detectors that feedback position information to the NC apparatus 101. Reference numeral 107 denotes a main-axis motor driven by the main-axis control unit 104. A position detector that feeds back position information to the NC apparatus 101 is provided in a main axis controlled by the main-axis control unit. Reference numerals 202, 203, 208, and 210 denote the servo control unit of control axes coupled to the NC apparatus 201, and 204 denotes the main-axis control unit coupled to the NC apparatus 201. Reference numerals 205, 206, 209, and 211 denote the servomotor driven by the servo control units 202, 203, 208, and 210 and these servomotors have position detectors that feed back position information to the NC apparatus 201. Reference numeral 207 denotes the main-axis motor driven by the main-axis control unit 204. A position detector that feeds back position information to the NC apparatus 201 is provided in a main axis driven by the main-axis motor.

Position information fed back to the axis control unit 223 of the NC apparatus 201 is also fed back to the interpolation control unit 120 of the NC apparatus 101. Position information fed back to the axis control unit 123 of the NC apparatus 101 is also fed back to the interpolation control unit 220 of the NC apparatus 201.

The display device 130 shared by the NC apparatus 101 and the NC apparatus 201 has a display screen and a keyboard, and is a known device.

The NC apparatuses 101 and 201 have known a hardware configuration including a CPU, a memory or the like, and are mounted with a processing unit, a control unit, a setting unit or the like configured by software explained below.

The NC apparatus 101 includes the analysis processing unit 111, the interpolation control unit 120, the PLC control unit 121, and the axis control unit 123.

The NC apparatus 201 includes the analysis processing unit 211, the interpolation control unit 220, the PLC control unit 221, and the axis control unit 223.

The analysis processing units 111 and 211 read each one block of an NC program stored in a memory (not shown), and analyze the program to perform an interpolation process and the like. The interpolation control unit 120 receives a result of analysis of the analysis processing unit 111, and performs an interpolation process of a predetermined axis at each predetermined time based on feedback data from the NC apparatus 201 transmitted through the axis control unit 223, the external communicating unit 253, the external communicating unit 153, and the virtual axis control unit 151. When a virtual axis is set to a control axis (for example, a main axis controlled by the main-axis motor 207) coupled to the NC apparatus 201, this interpolation control unit 120 also performs an interpolation process of this virtual axis. As a result of the interpolation process, a shift amount per interpolation unit of each control axis is generated. The axis control unit 123 outputs a shift amount per unit cycle after performing acceleration and deceleration of each control axis, to the servo control units 102 and 103 and the main-axis control unit 104 that are coupled. The servo control units 102, 103, 108, and 109 and the main-axis control unit 104 drive the coupled motors 105 to 107, 110, and 111 following the instructed shift amount.

The interpolation control unit 220 receives a result of the analysis processing unit 211, and performs an interpolation process of a predetermined axis at each predetermined time based on feedback data from the NC apparatus 101 transmitted through the axis control unit 123, the external communicating unit 153, the external communicating unit 253, and the virtual axis control unit 251. When a virtual axis is set to a control axis (for example, a main axis controlled by the main-axis motor 107) coupled to the NC apparatus 101, this interpolation control unit 220 also performs an interpolation process of this virtual axis. As a result of the interpolation process, a shift amount per interpolation unit of each control axis is generated. The axis control unit 223 outputs a shift amount per unit cycle after performing acceleration and deceleration of each control axis, to the servo control units 202, 203, 208, and 210 and the main-axis control unit 204 that are coupled. The servo control units 202, 203, 208, and 210 and the main-axis control unit 204 drive the coupled motors 205 to 207, 110, and 111 following the instructed shift amount.

The interpolation control units 120 and 220 also perform the operation described with reference to FIGS. 6, 9, and 10.

The PLC control units 121 and 221 process auxiliary instructions (M instructions) instructed by the NC program, and are a known device. Therefore, explanations thereof will be omitted.

Further, the NC apparatus 101 includes the axis exchange control unit 122, the virtual axis control unit 151, a delay control unit 152, the external communicating unit 153, the axis-control-right switch processing unit 154, the virtual-axis setting unit 155, and the external-switching-axis setting unit 156. The NC apparatus 201 includes an axis exchange control unit 222, the virtual axis control unit 251, a delay control unit 252, the external communicating unit 253, the axis-control-right switch processing unit 254, the virtual-axis setting unit 255, and the external-switching-axis setting unit 256.

The axis exchange control unit 122 exchanges a part or a whole of control axes belonging to the system by a program instruction and the like in the NC apparatus 101. The axis exchange control unit 222 exchanges a part or a whole of control axes belonging to the system by a program instruction and the like in the NC apparatus 201. In the axis exchange control units 122 and 222 according to the second embodiment, axes that are set as virtual-axes become control axes that can be exchanged.

The virtual axis control unit 151 included in the NC apparatus 101 is provided to control axes other than axes that the axis control unit 123 of the NC apparatus 101 can control out of control axes interpolated by the interpolation control unit 120. The virtual axis control unit 151 controls virtual-axes set by the virtual-axis setting unit 155.

That is, the virtual axis control unit 151 transmits an instruction position (a shift amount per unit cycle after performing acceleration and deceleration and the like of a virtual axis) of a virtual axis set by the virtual-axis setting unit 155 interpolated by the interpolation control unit 120, to the axis control unit 223 of the NC apparatus 201 via the external communicating unit 153 and the external communicating unit 253. In the case of the NC system shown in FIG. 12, when an axis controlled by the main-axis motor 207 coupled to the NC apparatus 201 is set as a virtual axis, for example, the virtual axis control unit 151 controls this main-axis motor 207.

The external communicating unit 153 is coupled to the external communicating unit 253 of the NC apparatus 201 by a communication path of bidirectional serial communication, Ethernet or a bus, and both external communicating units communicate with each other at every constant cycle. Therefore, an instruction position (a shift amount per unit cycle after performing acceleration and deceleration and the like of a virtual axis) transmitted by the virtual axis control unit 151 can be transmitted to the axis control unit 223 of the NC apparatus 201 via the external communicating units 153 and 253. Further, position information fed back to the NC apparatus 201 can be transmitted to the interpolation control unit 120 of the NC apparatus 101 through the axis control unit 223, the external communicating units 253 and 153, and the virtual axis control unit 151.

The virtual axis control unit 251 included in the NC apparatus 201 also has a function similar to that of the virtual axis control unit 151 included in the NC apparatus 101. That is, the virtual axis control unit 251 is provided to control axes other than axes that the axis control unit 223 of the NC apparatus 201 can control out of control axes interpolated by the interpolation control unit 220. The virtual axis control unit 251 controls virtual-axes set by the virtual-axis setting unit 255.

That is, the virtual axis control unit 251 transmits an instruction position (a shift amount per unit cycle after performing acceleration and deceleration and the like of a virtual axis) of a virtual axis set by the virtual-axis setting unit 255 interpolated by the interpolation control unit 220, to the NC apparatus 101 via the external communicating unit 253 and the external communicating unit 153, thereby controlling the virtual axis set by the virtual-axis setting unit 155. In the case of the NC system shown in FIG. 12, when a main axis controlled by the main-axis motor 107 coupled to the NC apparatus 101 is set as a virtual axis, for example, the virtual axis control unit 251 controls this main-axis motor 107.

In the NC apparatus according to the second embodiment, when an axis coupled to the NC apparatus 201 is allocated as a virtual axis of the NC apparatus 101, and also when an axis coupled to the NC apparatus 101 and the virtual axis are interpolated, an instruction to a servo control unit or a main-axis control unit that drives a control axis coupled to the NC apparatus 201 is output through the virtual axis setting unit 155, the external communicating unit 153, the external communicating unit 253, the axis-control-right switch processing unit 254, and the axis control unit 223. Therefore, response is delayed from that when the instruction is output to a servo control unit or a main-axis control unit that drives the control axis coupled to the NC apparatus 101. The delay control unit 152 of the NC apparatus 101 is provided to correct a deviation of output timing due to this response delay. As shown in a time chart of FIG. 13, a shift amount to an axis coupled to the NC apparatus 101 is once buffered to an interpolation output from the same timing, thereby delaying output to the axis control unit 123. As a result, when this delay is set as time or a cycle until when the NC apparatus 101 outputs to a servo control unit or a main-axis control unit coupled to the NC apparatus 201, both the NC apparatus 101 and the NC apparatus 201 can output at the same timing.

The delay control unit 252 of the NC apparatus 201 also has a function similar to that of the delay control unit 152 of the NC apparatus 101. In the NC apparatus 201, an interpolation process is performed to an axis coupled to the NC apparatus 201 and a virtual axis coupled to the NC apparatus 101. A shift amount output from the interpolation control unit 220 to the axis control unit 223 is once buffered, thereby delaying output to the axis control unit 223 so that each shift amount is transmitted to a corresponding servo control unit or a main-axis control unit at the same time.

The axis-control-right switch processing unit 154 included in the NC apparatus 101 switches the control right of a control axis set as an external-switching effective axis in the external-switching-axis setting unit 156 of the NC apparatus 101 out of axes controllable by the axis control unit 123, to either shift an axis following an interpolation shift amount generated as a result of an interpolation process of the interpolation control unit 120 included in the NC apparatus 101, or receive via the external communicating unit 153 an interpolation shift amount to a virtual control axis generated as a result of an interpolation process of the interpolation control unit 220 included in the NC apparatus 201 at the outside and shift an axis following the received interpolation shift amount. The axis-control-right switch processing unit 154 switches the control right following priority based on an instruction of a machining program operated by the NC apparatus 201 at the outside or an instruction of a machining program operated by the NC apparatus 101.

The control right can be also switched by a signal from the PLC control unit.

The axis-control-right switch processing unit 254 included in the NC apparatus 201 has a function similar to that of the axis-control-right switch processing unit 154 of the NC apparatus 101. That is, the axis-control-right switch processing unit 254 switches a control right of a control axis set as an external-switching effective axis in the external-switching-axis setting unit 256 of the NC apparatus 201 out of axes controllable by the axis control unit 223, to either shift an axis following an interpolation shift amount generated as a result of an interpolation process of the interpolation control unit 220 included in the NC apparatus 201, or receive via the external communicating unit 253 an interpolation shift amount to a virtual control axis generated as a result of an interpolation process of the interpolation control unit 120 included in the NC apparatus 101 at the outside and shift an axis following the received interpolation shift amount.

Functions of the virtual-axis setting units 155 and 255 and the external-switching-axis setting unit 156 and 256 are described later with reference to FIG. 15.

FIG. 14 is an axis configuration example of the NC system according to the second embodiment of the present invention. Because the NC apparatus 101 and the NC apparatus 201 operate based on separate CPUs, the respective NC apparatuses independently operate following separate NC programs in each control system. The NC apparatus 101 and the NC apparatus 201 are coupled to each other by the external communicating unit 153 and the external communicating unit 253.

In this example, the NC apparatus 101 has a two-system configuration including a first system configured by an X11 axis, a Z11 axis, and a C11 axis, and a second system configured by an X12 axis and a Z12 axis. By the NC program 140 performed by the first system of the NC apparatus 101, the X11 axis, the Z11 axis, and the C11 axis can be position-instructed at addresses of X, Z, and C, respectively. By the NC program 140 performed by the second system of the NC apparatus 101, the X12 axis and the Z12 axis can be position-instructed at addresses of X, Z, respectively. The C11 axis is allocated as a main-axis C-axis control axis of which rotation instruction is possible by a speed instruction at an S address, and can operate as an S11 axis not only being position-instructed as the C11 axis.

The NC apparatus 201 has a one-system configuration having an X21 axis, a Z21 axis, a Y21 axis, a C21 axis, and a V21 axis (rotation axis) coupled to this apparatus. By the NC program 240 performed by a first system of the NC apparatus 201, the X21 axis, the Z21 axis, the Y21 axis, the C21 axis, and the V21 axis can be position-instructed at addresses of X, Z, Y, C, and V respectively. The C21 axis is allocated as a main-axis C-axis control axis of which rotation instruction is possible by a speed instruction at the S address, and can operate as an S21 axis not only being position-instructed as the C21 axis.

Further, in the NC apparatus 101, a virtual C21 axis and a virtual V21 axis are further set as virtual positioning axes, in addition to the control axes (the X11 axis, the Z11 axis, the C11 axis, the X12 axis, and the Z12 axis) coupled to the NC apparatus 101. In the NC apparatus 201, a virtual C11 axis is further set as a virtual positioning axis, in addition to the control axes (the X21 axis, the Z21 axis, the Y21 axis, the C21 axis, and the V21 axis) coupled to the NC apparatus 201.

FIG. 15 depicts setting examples of a virtual axis and an external-switching effective axis in the NC system having the axis configuration as shown in FIG. 14. In the NC apparatus 101, the X11 axis, the Z11 axis, and the C11 axis (the S11 axis) of the first system, and the X12 axis and Z12 axis of the second system are coupled. The C21 axis and V21 axis are allocated as virtual-axes. In the NC apparatus 201, the X21 axis, the Z21 axis, the Y21 axis, the C21 axis (the S21 axis), and the V21 axis of the first system are coupled. The C11 axis is allocated as a virtual axis.

In the setting examples in FIG. 15, the virtual-axis setting unit 155 sets the C21 axis as a virtual axis to the V01 station out of communication stations V01 to V04 of the virtual axis of the NC apparatus 101, and is allocated to the P01 station of an external-switching effective axis of M02 indicating the NC apparatus 201 as a communication connection destination. The V21 axis is set to the V02 station, and is allocated to a P02 station of the external-switching effective axis of M02 indicating the NC apparatus 201 as a communication connection destination.

The external-switching-axis setting unit 156 sets the C21 axis as an external switching axis to the P01 station out of communication stations P01 to P04 of an external-switching effective axis of the NC apparatus 201. In the NC apparatus 101, when instruction is made to the virtual C21 axis, the virtual-axis communication station V01 of the NC apparatus 101 and the external-switching-axis communication station P01 of the NC apparatus 201 communicate with each other at a predetermined cycle. A control right of the C21 axis coupled to the NC apparatus 201 set in the external-switching-axis communication station P01 of the NC apparatus 201 is switched, thereby performing shifting. The external-switching-axis setting unit 156 sets the V21 axis as an external switching axis to the P02 station. In the NC apparatus 101, when instruction is made to the virtual V21 axis, the virtual-axis communication station V02 of the NC apparatus 101 and the external-switching-axis communication station P02 of the NC apparatus 201 communicate with each other at a predetermined cycle. A control right of the V21 axis coupled to the NC apparatus 201 set in the external-switching-axis communication station P02 of the NC apparatus 201 is switched, thereby performing shifting.

The virtual-axis setting unit 255 sets the C11 axis as a virtual axis to the V01 station out of the communication stations V01 to V04 of the virtual axis of the NC apparatus 201, and is allocated to the P01 station of an external-switching effective axis of M01 indicating the NC apparatus 201 as a communication connection destination.

The external-switching-axis setting unit 256 sets the C11 axis as an external switching axis to the P01 station out of communication stations P01 to P04 of an external-switching effective axis of the NC apparatus 101. In the NC apparatus 201, when instruction is made to the virtual C11 axis, the virtual-axis communication station V01 of the NC apparatus 201 and the external-switching-axis communication station P01 of the NC apparatus 101 communicate with each other at a predetermined cycle. A control right of the C11 axis coupled to the NC apparatus 201 set in the external-switching-axis communication station P01 of the NC apparatus 101 is switched, thereby performing shifting.

Such setting is performed before machine operation, and the display device 130 displays a setting screen as shown in FIG. 15. An operator inputs from a keyboard of the NC apparatuses 101 and 201 to perform the setting.

Contents of the setting can be described at the header of each NC program, and the setting units 155, 156, 255, and 256 can perform the setting at the time of reading each NC program.

Figure 17:
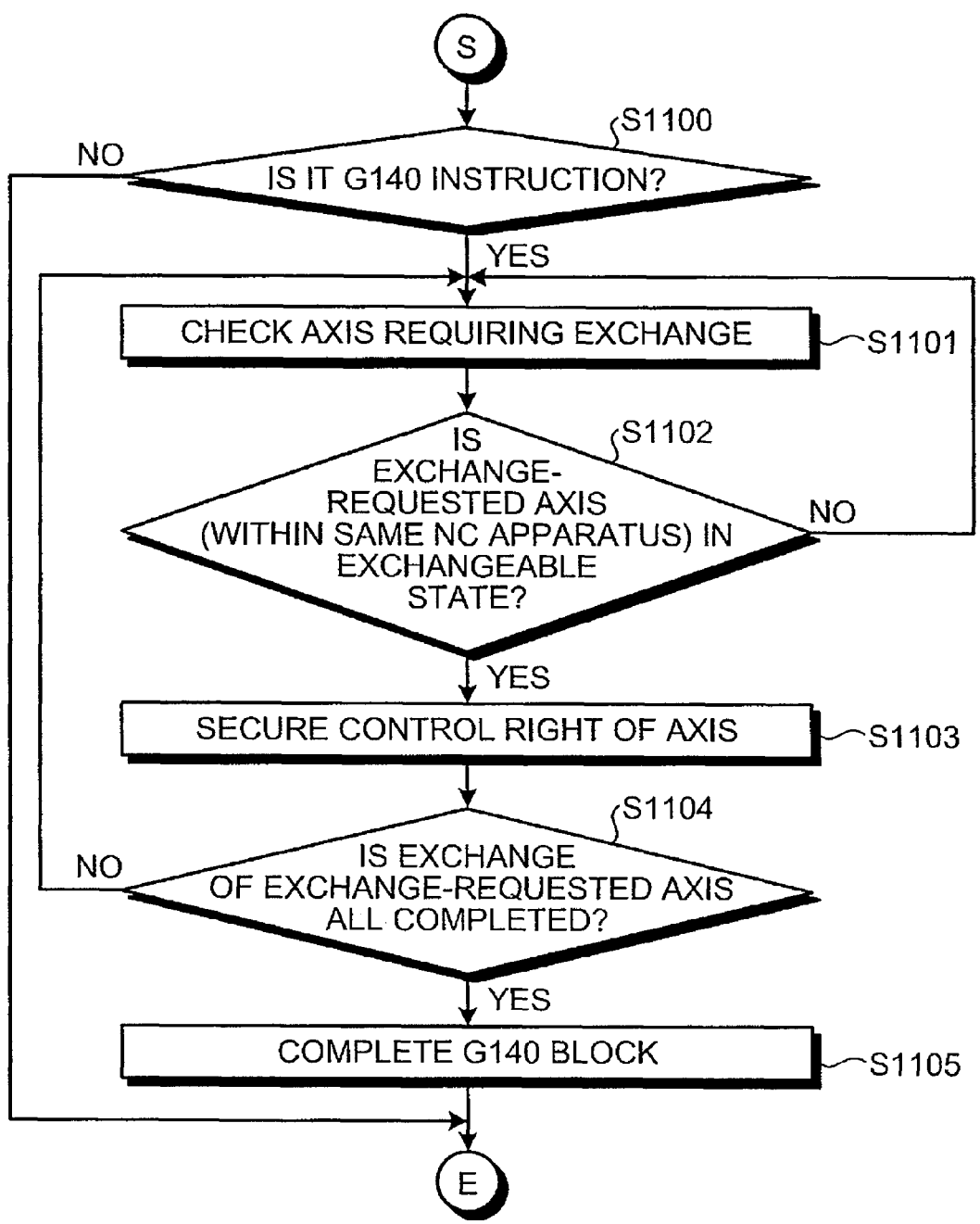
FIG. 17 is a flowchart of an operation of an axis exchange control unit in the NC apparatus according to the second embodiment of the present invention when an axis exchange instruction is made.

FIG. 17 is a flowchart of an operation of the axis exchange control units 122 and 222 of the NC apparatus when an axis exchange (G140) instruction as shown in FIG. 16 is made in the axis configuration shown in FIG. 14 and in a state of setting shown in FIG. 15.

That is, at Step S1100, it is determined whether an instruction is a G140 instruction. When an instruction is the G140 instruction, it is checked at Step S1101 whether an axis requires exchange. Specifically, when an instruction of G140 X=X12 Z=Z12 C=C11; is made, it is checked whether a control axis of an X instruction is held as the X12 axis, whether a control axis of a Z instruction is held as the Z11 axis, and whether a control axis of a C instruction is held as the C11 axis. When a control axis is not held, exchange of an axis is requested to the control axis.

At Step S1102, it is then determined whether an exchange-requested axis is in an exchangeable state. When the exchange-requested axis is in an exchangeable state, the control right of the axis is secured and the axis is exchanged at Step S1103. When exchange of exchange-requested axis is all completed at Step S1104, a G140 instruction block is completed at Step S1105, and the process proceeds to the next block.

Figure 18:
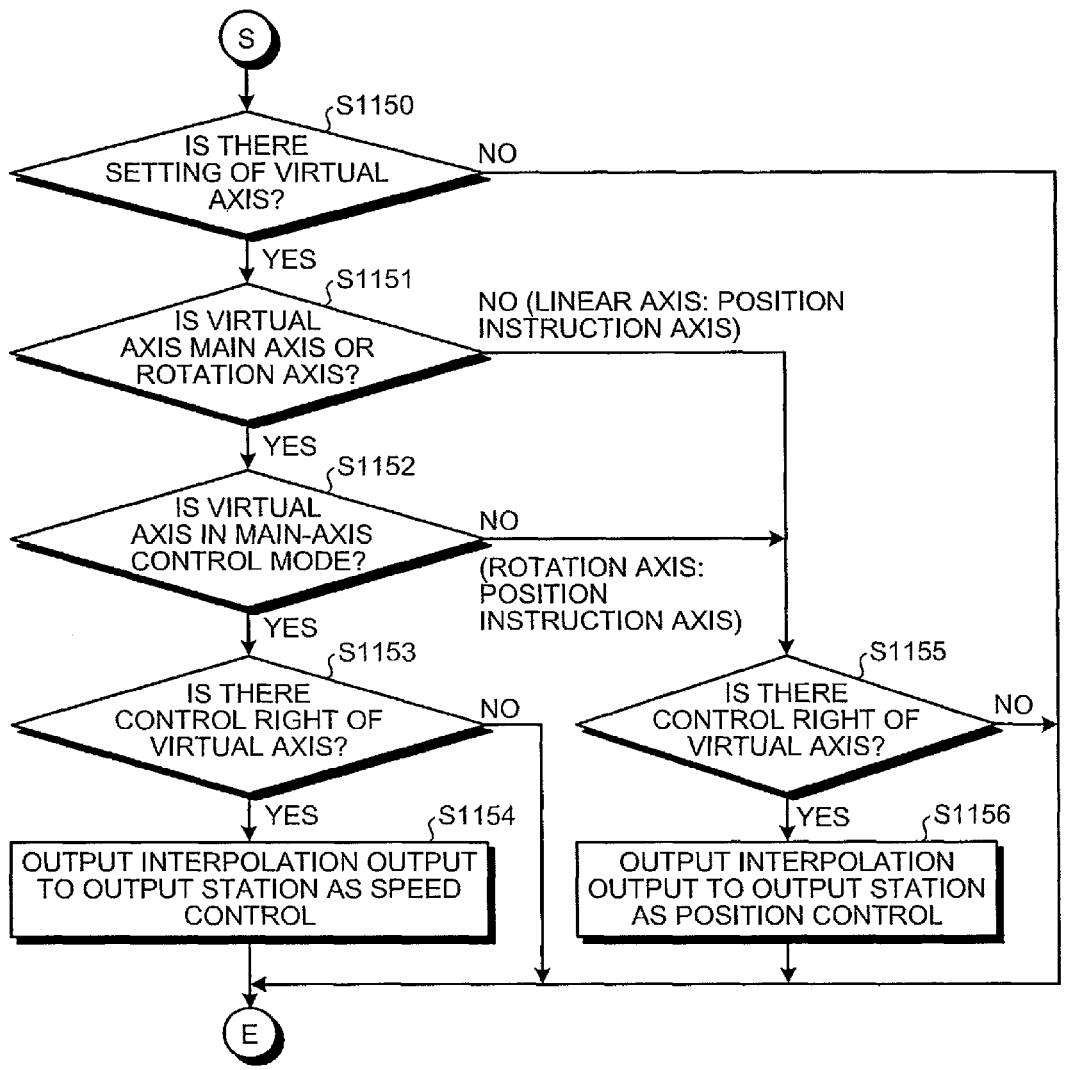
FIG. 18 is a flowchart of an interpolation output operation with respect to a virtual axis in a virtual axis control unit in the NC apparatus according to the second embodiment of the present invention.

FIG. 18 is a flowchart of an interpolation output to a virtual axis in the virtual axis control units 151 and 251 according to the second embodiment. At Step S1150, it is determined whether this is a setting of a virtual axis. When this is a setting of a virtual axis, at Step S1151, it is determined whether the virtual axis is a main axis (for example, the S11 axis and the S21 axis) or a rotation axis (for example, the V21 axis, the C11 axis, and the C21 axis). When the virtual axis is a main axis or a rotation axis, it is determined at Step S1152 whether the virtual axis is in a main-axis control mode. When the main-axis control mode is selected, it is determined at Step S1153 whether there is a control right of the virtual axis. When there is a control right, at Step S1154, an interpolation output from speed control of this virtual axis is output to an output station set in the virtual axis.

When the virtual axis is a linear axis (for example, the X11 axis, the Z11 axis, the X12 axis, the Z12 axis, the X21 axis, the Z21 axis, and the Y21 axis) at Step S1151, or when the virtual axis (a main axis or a rotation axis) is not in the main-axis control mode but a rotation axis giving a position instruction, it is determined at Step S1155 whether there is a control right of the virtual axis. When there is a control right, at Step S1156, an interpolation output from position control of this virtual axis is output to an output station set in the virtual axis.

In the axis configuration as shown in FIG. 14, when an NC program as shown in FIG. 16 is performed in an NC system in which the virtual axis as shown in FIG. 15 is set, the NC apparatuses 101 and 201 operate as follows. That is, in an N2 block of an NC program 142 operated in the second system of the NC apparatus 101, by the instruction of G140 X=X12 Z=Z12 C=C11; the second system of the NC apparatus 101 obtains a control right by first replacing the C11 axis of the first system of the NC apparatus 101 with the second system, in addition to the X12 axis and the Z12 axis configuring the second system, and instructs positions to the X12 axis, the Z12 axis, and the C11 axis at the addresses X, Z, and C, respectively.

In an N1 block of an NC program 141 operated in the first system of the NC apparatus 101, by an instruction of G140 X=X11 Z=Z11 C=C21, the first system of the NC apparatus 101 obtains a control right of the C21 axis coupled to the NC apparatus 201, in addition to a control right of the X11 axis and the Z11 axis. In this case, the NC apparatus 101 communicates with the external-switching-effective-axis communication station P01 of the NC apparatus 201 from the virtual-axis communication station V01 in a sequence similar to the sequence explained with reference to FIG. 8, and obtains a control right of the C21 axis. The NC apparatus 201 switches control of the C21 axis to the external-switching-effective-axis communication station P01. The first system of the NC apparatus 101 transmits an instruction position of C21 to the NC apparatus 201 at a predetermined cycle, and can control the C21 axis following an auxiliary output from the NC apparatus 101.

Similarly, in an N4 block of an NC program 241 operated in the first system of the NC apparatus 201, by an instruction of G140 X=X21 Z=Z21 Y=Y21 C=C11, the NC apparatus 201 can control the C11 axis coupled to the NC apparatus 101.

Next, in an N3 block of the NC program 142 operated in the second system of the NC apparatus 101, by an instruction of G140 X=X12 Z=Z12 V=V21, the NC apparatus 101 obtains a control right of the X12 axis, the Z12 axis, and the V21 axis. The NC apparatus 201 releases the control right of the V21 axis beforehand in the N4 block performed before. Because the NC apparatus 101 obtains the control right of the V21 axis, the NC apparatus 101 and the NC apparatus 201 communicate with each other at a predetermine cycle, and the NC apparatus 201 outputs an interpolation output to the V21 axis as a virtual axis generated by the NC apparatus 101, to the V21 axis coupled to the NC apparatus 201, by communicating with the external-switching-effective-axis communication station P02 of the NC apparatus 201 at a predetermined cycle. The NC apparatus 201 transmits a feedback position of the V21 axis to the NC apparatus 101.

In the second embodiment, based on combinations of control axes extending to a system between the NC apparatuses 101 and 201 (for example, a combination of the X11 axis, the Z11 axis, and the S21 axis, a combination of the X12 axis, the Z12 axis, and the S21 axis, and a combination of the X21 axis, the Z21 axis, and the S11 axis), synchronization control of feed-per-revolution control and thread cutting as explained with reference to FIG. 1 can be also performed. For example, in the combined configuration of the X21 axis, the Z21 axis, and the S11 axis (a configuration that a tool table which is thread-cutting-bite fixed is shifted by the X21 axis and the Z21 axis, and the workpiece is rotated by the S11 axis), when a thread cutting process is performed by interpolation power from the NC apparatus 201, feedback position data from a position detector of the S11 axis of the NC apparatus 101 is fetched to the interpolation control unit 220 of the NC apparatus 201, and the interpolation control unit 220 calculates a shift amount of the Z21 axis and outputs this shift amount to the Z21 axis, in a similar manner to that explained in the first embodiment. With this arrangement, the Z21 axis is transmitted to a Z axis direction, and a workpiece rotated by the S11 axis can be threaded.

As explained above, according to the second embodiment, a system is configured by combining a control axis or a virtual control axis coupled to an NC apparatus concerned. By exchanging an axis between systems and by replacing a combination of axes configuring a system, interpolation control and synchronization control are performed. An interpolation output from a virtual axis is transmitted to a control axis coupled to a separate NC apparatus, by communicating with the separate NC apparatus, thereby controlling the virtual axis. Therefore, interpolation control and synchronization control can be performed by configuring a system by combining control axes of NC apparatuses operated by different CPUs, as well as a control axis coupled to the NC apparatus.

Interpolation can be performed by combining NC apparatuses of the number of systems and the number of control axes that can be applied to general NC machine tools. Therefore, the number of systems that can be simultaneously operated can be increased without developing exclusive high-performance hardware. Irrespectively of hardware of an NC apparatus, control axes can be exchanged between systems, a system can be configured by necessary axes, and NC-control can be performed.

Control timings of axes extending between NC apparatuses can be matched, and further, synchronization control of axes extending between NC apparatuses can be performed in high precision.

Even when linear axes or rotation axes of which position is instructed in each system are coupled to separate NC apparatuses, a machine operator can perform switching of control systems of the linear axes or the rotation axes, positioning, and interpolation control of shift instructions combining axes of different NC apparatuses, as if control is being performed by one NC apparatus, without being conscious about NC apparatuses coupling the linear axes or the rotation axes.

Even when main axes of which speed is instructed in each system are coupled to separate NC apparatuses, and also even when linear axes or rotation axes of which position is instructed in each system are coupled to separate NC apparatuses, a machine operator can perform switching of control systems of the main axes, speed control, steady control of circumferential velocity synchronous with coordinate values of linear axes or rotation axes of each system, and feed per revolution and thread cutting synchronous with rotations of the main axes, and can perform switching of control systems of the linear axes or the rotation axes, positioning, and interpolation of shift instructions combining axes of different NC apparatuses, as if control is being performed by one NC apparatus, without being conscious about NC apparatuses to which the main axes are coupled and NC apparatuses coupling the linear axes or the rotation axes.

The delay control unit explained in the second embodiment can be also provided in the NC apparatus 101 in the first embodiment. When this delay control unit is provided in the NC apparatus 101, in the first embodiment, control timings of the control axis coupled to the NC apparatus 101 and the control axis coupled to the NC apparatus 201 can be matched.

Third Embodiment

A third embodiment of the present invention in which this invention is applied to a multi-spindle automatic lathe is explained below with reference to FIG. 19 to FIG. 29.

Figures 19, 20:
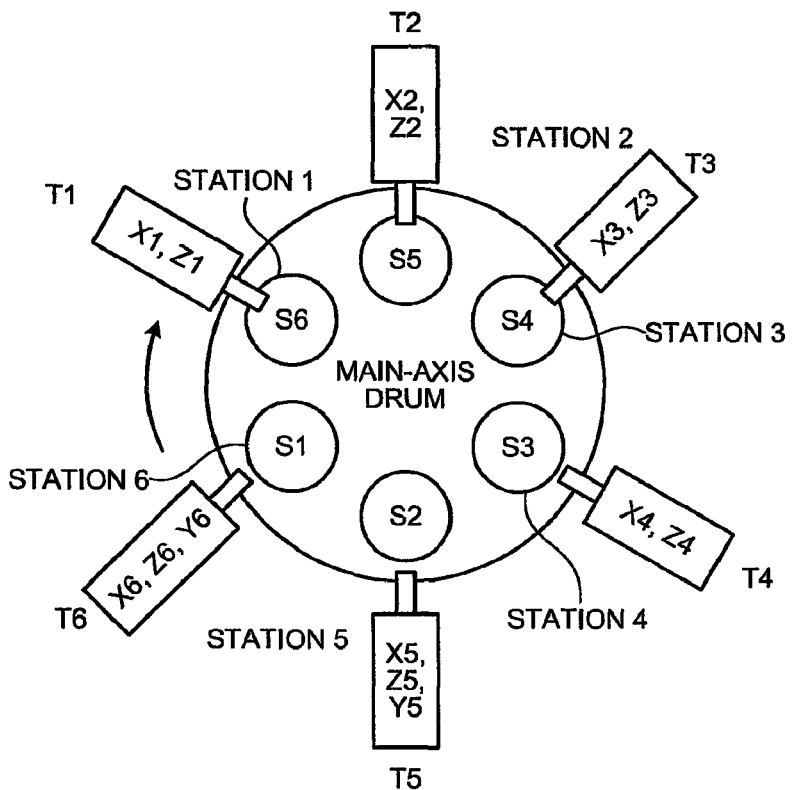
FIG. 19 is a configuration diagram of an example of a machine tool according to a third embodiment of the present invention that applies the NC system according to the present invention.
FIG. 20 is a configuration example of a system and axis of the machine tool according to the third embodiment of the present invention that applies the NC system according to the present invention.

FIG. 19 is an example of a machine tool that performs control in an NC system according to the third embodiment. This machine tool is a multi-spindle automatic lathe, and has six main axes S1 to S6 mounted on a main-axis drum, each main axis holding and rotating a workpiece to be machined. When the main-axis drum revolves, the arrangement of the main axes shifts to a determined station. To machine a workpiece at each station, tools T1 to T6 are arranged at the stations, and each station is controlled by an independent system.

In the third embodiment, the tool T1 operates in the X1 axis and the Z1 axis. The tool T2 operates in the X2 axis and the Z2 axis. The tool T3 operates in an X3 axis and a Z3 axis. The tool T4 operates in an X4 axis and a Z4 axis. The tool T5 operates in an X5 axis, a Z5 axis, and a Y5 axis. The tool T6 operates in an X6 axis, a Z6 axis, and a Y6 axis. The main axis S1 axis can be position-controlled as a C1 axis. The main axis S2 axis can be position-controlled as a C2 axis. A main axis S3 axis can be position-controlled as a C3 axis. A main axis S4 axis can be position-controlled as a C4 axis. A main axis S5 axis can be position-controlled as a C5 axis. A main axis S6 axis can be position-controlled as a C6 axis.

To NC-control the machine tool described above, an NC apparatus capable of controlling six systems and 20 axes in total is necessary. In the third embodiment, it is assumed that the tool T1 operates in the X1 axis and the Z1 connected to an NC apparatus 1 (hereinafter, NC#1), that the tool T2 operates in the X2 axis and the Z2 axis connected to the NC#1, that the tool T3 operates in the X3 axis and the Z3 axis connected to the NC#1, that the tool T4 operates in the X4 axis and the Z4 axis connected to the NC#1, that the tool T5 operates in the X5 axis, the Z5 axis, and the Y5 axis connected to an NC apparatus 2 (hereinafter, NC#2), and that the tool T6 operates in the X6 axis, the Z6 axis, and the Y6 axis connected to the NC#2. The main axes S1 axis to S6 axis are connected to the NC#2, and the main axis S1 axis can be position-controlled as the C1 axis, the main axis S2 axis can be position-controlled as the C2 axis, the main axis S3 axis can be position-controlled as the C3 axis, the main axis S4 axis can be position-controlled as the C4 axis, the main axis S5 axis can be position-controlled as the C5 axis, and the main axis S6 axis can be position-controlled as the C6 axis. The NC#1 has, as virtual-axes, each main axis/C axis of the main axis S1 axis (C1 axis), the main axis S2 axis (C2 axis), the main axis S3 axis (C3 axis), the main axis S4 axis (C4 axis), the main axis S5 axis (C5 axis), and the main axis S6 axis (C6 axis).

That is, as shown in FIG. 20, the NC#1 controls total 14 axes, including total eight axes of the X1 axis, the Z1 axis, the X2 axis, the Z2 axis, the X3 axis, the Z3 axis, the X4 axis, and the Z4 axis as connection axes, and total six axes of the S1 axis (C1 axis), the S2 axis (C2 axis), the S3 axis (C3 axis), the S4 axis (C4 axis), the S5 axis (C5 axis), and the S6 axis (C6 axis) as virtual-axes. The NC#2 controls total 12 axes, including the X5 axis, the Z5 axis, the Y5 axis, the X6 axis, the Z6 axis, the Y6 axis, the S1 axis (C1 axis), the S2 axis (C2 axis), the S3 axis (C3 axis), the S4 axis (C4 axis), the S5 axis (C5 axis), and the S6 axis (C6 axis) as connection axes. Further, the S1 axis (C1 axis), the S2 axis (C2 axis), the S3 axis (C3 axis), the S4 axis (C4 axis), the S5 axis (C5 axis), and the S6 axis (C6 axis) connected to the NC#2 are set as external switching axes that are switched to operate following instructions of the virtual-axes of the NC#1 including the S1 axis (C1 axis), the S2 axis (C2 axis), the S3 axis (C3 axis), the S4 axis (C4 axis), the S5 axis (C5 axis), and the S6 axis (C6 axis), respectively.

This setting is performed by the virtual-axis setting unit and the external-switching-axis setting unit shown in FIG. 12.

For an initial arrangement, in the NC#1, a system 1 to a system 4 do not have any control right of the virtual-axes of the S1 axis (C1 axis) and the S2 axis (C2 axis). Therefore, these virtual-axes are set to a free state as unused axes. In the NC#2, a system 1 to a system 2 of the NC#2 do not have any control right of the connection axes of the S3 axis (C3 axis), the S4 axis (C4 axis), the S5 axis (C5 axis), the S6 axis (C6 axis). Therefore, these connection axes are similarly set to a free state as unused axes.

In the machine tool according to the third embodiment, before starting machining of a first cycle, a main-axis drum revolves, and the main axis S1 is arranged in a station 1, the main axis S6 is arranged in a station 2, the main axis S5 is arranged in a station 3, the main axis S4 is arranged in a station 4, the main axis S3 is arranged in a station 5, and the main axis S2 is arranged in a station 6.

Thereafter, in the station 1, machining is performed by a combination of the tool T1 and the main axis S1. At the same time, before starting machining, the arrangement is switched to systems and axis configurations as shown in FIG. 21, and interpolation and synchronization operation are performed following program instructions in each system, to perform machining by a combination of the tool T2 and the main axis S6 in the station 2, perform machining by a combination of the tool T3 and the main axis S5 in the station 3, perform machining by a combination of the tool T4 and the main axis S4 in the station 4, perform machining by a combination of the tool T5 and the main axis S3 in the station 5, and perform machining by a combination of the tool T6 and the main axis S2 in the station 6.

Before starting machining of a second cycle, a main-axis drum revolves, and the main axis S2 is arranged in the station 1, the main axis S1 is arranged in the station 2, the main axis S6 is arranged in the station 3, the main axis S5 is arranged in the station 4, the main axis S4 is arranged in the station 5, and the main axis S3 is arranged in the station 6.

Thereafter, in the station 1, machining is performed by a combination of the tool T1 and the main axis S2. At the same time, machining is performed by a combination of the tool T2 and the main axis S1 in the station 2, machining is performed by a combination of the tool T3 and the main axis S6 in the station 3, machining is performed by a combination of the tool T4 and the main axis S5 in the station 4, machining is performed by a combination of the tool T5 and the main axis S4 in the station 5, and machining is performed by a combination of the tool T6 and the main axis S3 in the station 6. That is, systems and axis configurations are arranged as shown in FIG. 22, and interpolation and synchronization operation are performed following program instructions in each system.

Thereafter, the main-axis drum revolves at each cycle, the main axis arranged in each station is sequentially changes, and systems and axis configurations are arranged as shown in FIG. 23 to FIG. 26, thereby performing machining in each cycle. In a sixth cycle, systems and axis configurations are arranged as shown in FIG. 27. In the station 1, machining is performed by a combination of the tool T1 and the main axis S6. At the same time, machining is performed by a combination of the tool T2 and the main axis S5 in the station 2, machining is performed by a combination of the tool T3 and the main axis S4 in the station 3, machining is performed by a combination of the tool T4 and the main axis S3 in the station 4, machining is performed by a combination of the tool T5 and the main axis S2 in the station 5, and machining is performed by a combination of the tool T6 and the main axis S1 in the station 6.

In a seventh cycle, a main-axis drum revolves, and the main axis S1 is arranged in the station 1, the main axis S6 is arranged in the station 2, the main axis S5 is arranged in the station 3, the main axis S4 is arranged in the station 4, the main axis S3 is arranged in the station 5, and the main axis S2 is arranged in the station 6. Therefore, the axis configuration returns to that shown in FIG. 21, machining is performed in a configuration similar to that of the first cycle, and thereafter, machining similar to that of the first to sixth cycles is repeatedly performed.

As described above, in a system that controls each tool, a main axis that rotate or positions a workpiece is sequentially switched. In each station, when lathing or thread cutting is performed synchronously with rotation of the main axis, shift of a tool needs to be interpolated synchronously with the rotation of the main axis. When milling is performed in each station, a feeding axis of a tool and a rotation axis (C axis) of the main axis need to be simultaneously interpolated by switching the main axis to a position control axis (C axis).

Figures 26, 27:
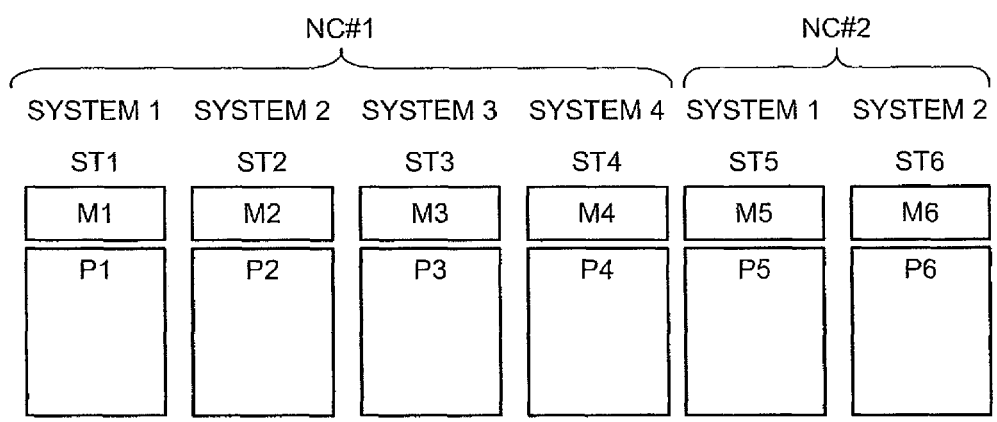
FIG. 26 is a configuration example of a system and axis of the machine tool according to the third embodiment of the present invention that applies the NC system according to the present invention, in a sixth cycle of machining.
FIG. 27 is a configuration example of a machining program of the machine tool according to the third embodiment of the present invention that applies the NC system according to the present invention.

In the case of the NC system that controls a machine tool according to the present embodiment, as shown in FIG. 27, a machining program P1 of a station 1 (ST1) is performed in a system 1 of the NC#1, a machining program P2 of a station 2 (ST2) is performed in a system 2 of the NC#1, a machining program P3 of a station 3 (ST3) is performed in a system 3 of the NC#1, a machining program P4 of a station 4 (ST4) is performed in a system 4 of the NCH/the NC#1, a machining program P5 of a station 5 (ST5) is performed in a system 1 of the NC#2, and a machining program P6 of a station 6 (ST6) is performed in a system 2 of the NC#2, thereby performing machining suitable for a tool arranged in each station.

Before performing the machining, a main-axis drum needs to revolve so that each main axis is at a predetermined station position. Therefore, a program M1 is performed to switch a main-axis station in the station 1 (ST1), a program M2 is performed to switch a main-axis station in the station 2 (ST2), a program M3 is performed to switch a main-axis station in the station 3 (ST3), a program M4 is performed to switch a main-axis station in the station 4 (ST4), a program M5 is performed to switch a main-axis station in the station 5 (ST5), and a program M6 is performed to switch a main-axis station in the station 6 (ST6), thereby revolving the main axis, and the arrangement of the S1 axis (C1 axis) to the S6 axis (C6 axis) is rotated.

Figure 28:
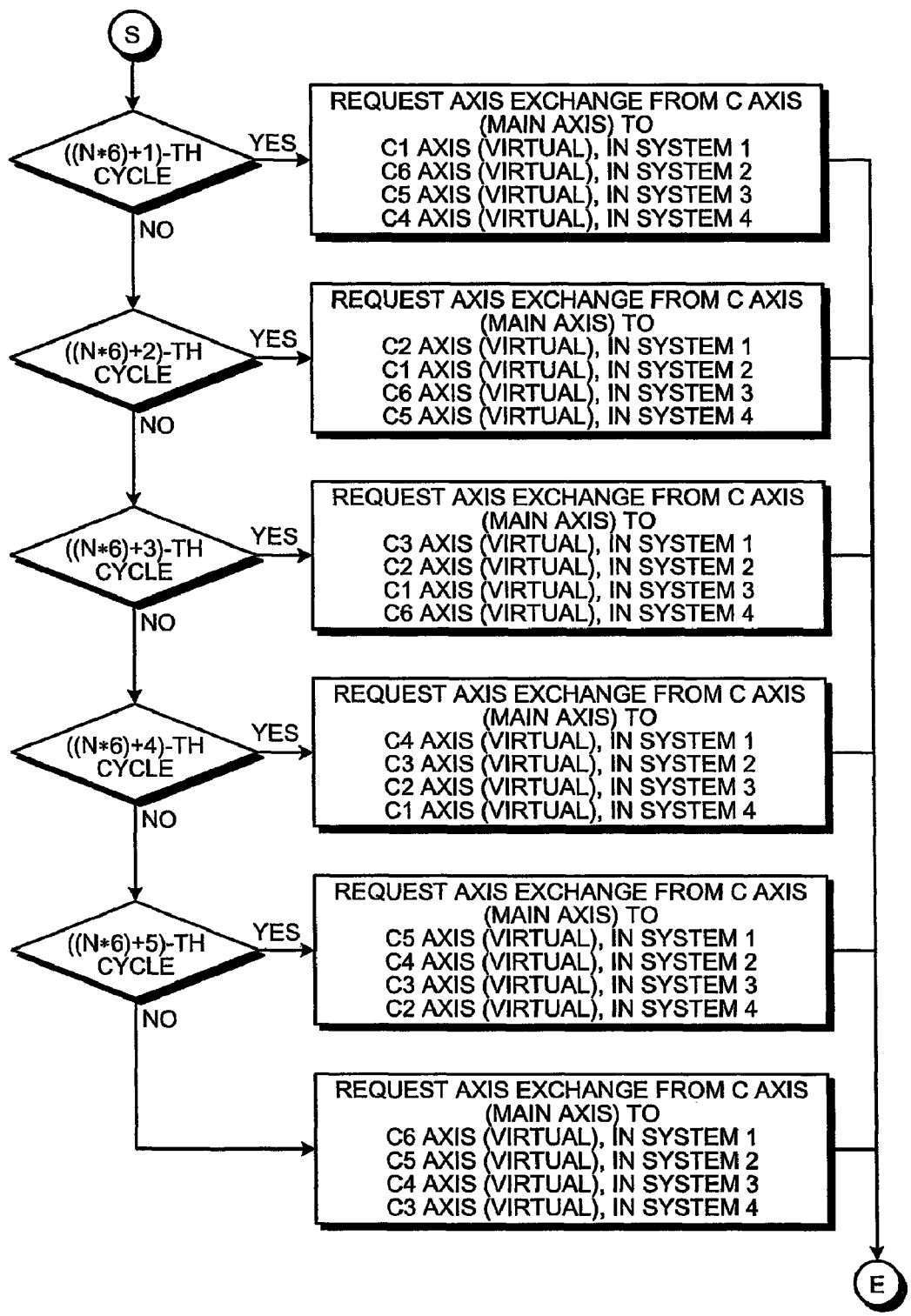
FIG. 28 is a flowchart of a control-axis exchange operation of an NC#1 of the machine tool according to the third embodiment of the present invention that applies the NC system according to the present invention.

In this case, within a switching program of a main-axis station of the NC#1, an axis exchange request of the C axis (main axis) of each system is performed following the flowchart of FIG. 28. For example, in the system 1 of the NC#1, the first cycle has an axis configuration of the X1 axis, the Z1 axis, and the C1 axis (S1 axis), the second cycle has an axis configuration of the X1 axis, the Z1 axis, and the C2 axis (S2 axis), the third cycle has an axis configuration of the X1 axis, the Z1 axis, and the C3 axis (S3 axis), the fourth cycle has an axis configuration of the X1 axis, the Z1 axis, and the C4 axis (S4 axis), the fifth cycle has an axis configuration of the X1 axis, the Z1 axis, and the C5 axis (S5 axis), and the sixth cycle has an axis configuration of the X1 axis, the Z1 axis, and the C6 axis (S6 axis). In each one cycle, when necessary, a control main axis (C axis) of each system is switched, and machining is repeated.

Figure 29:
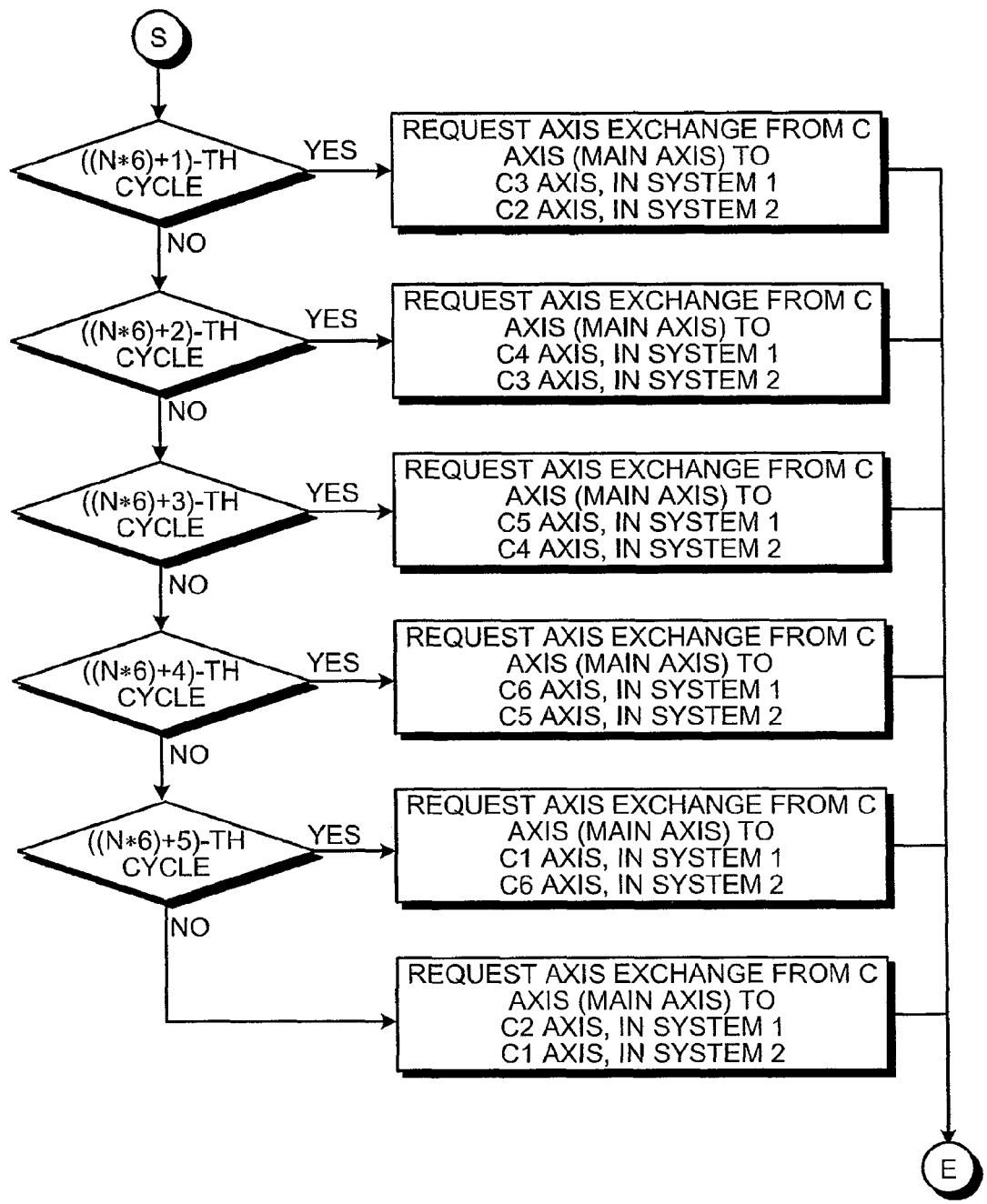
FIG. 29 is a flowchart of a control-axis exchange operation of an NC#2 of the machine tool according to the third embodiment of the present invention that applies the NC system according to the present invention.
Figure 30:
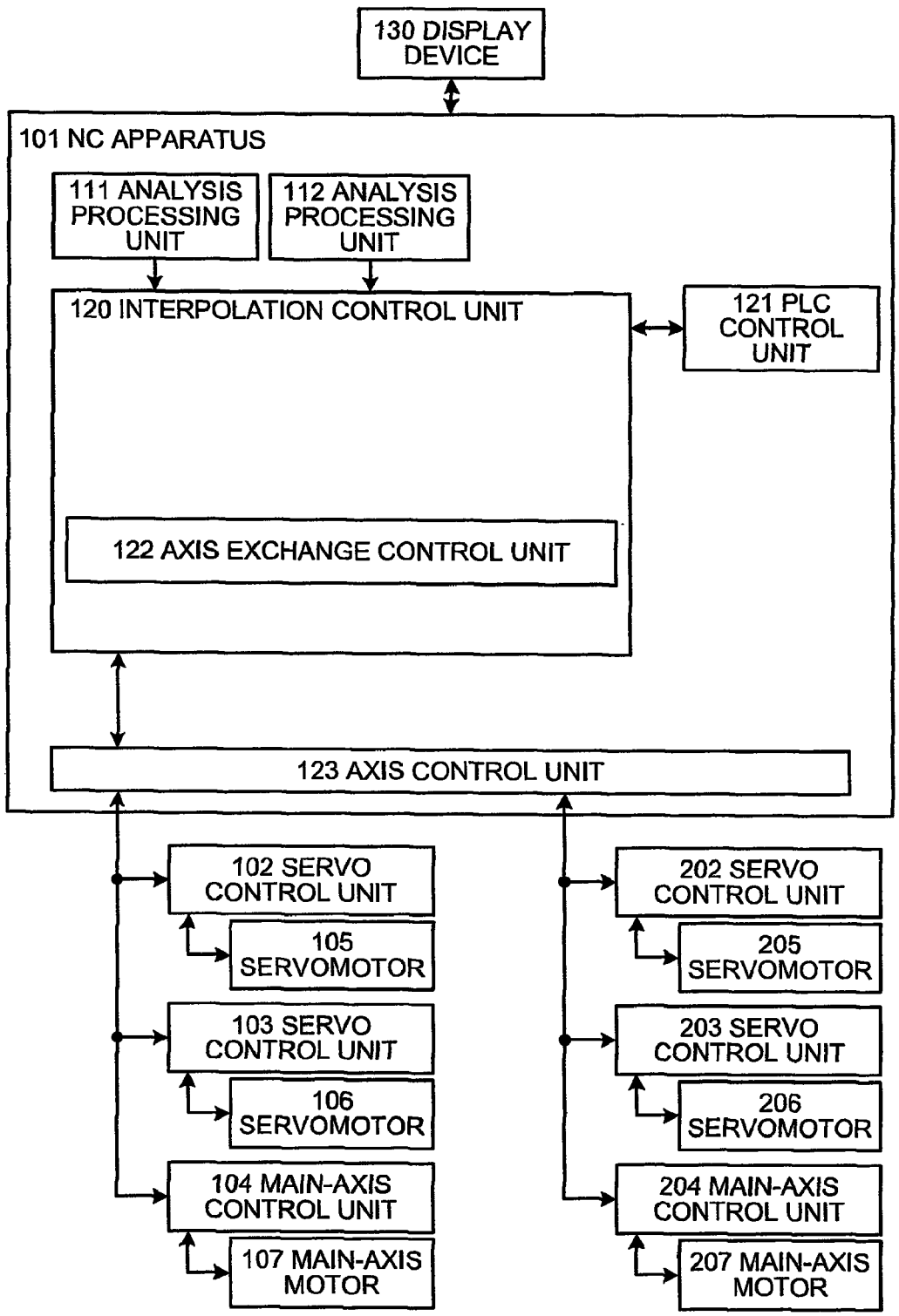
FIG. 30 is a block diagram of a configuration of a conventional multi-axis/multi-system NC apparatus.
Figure 31:
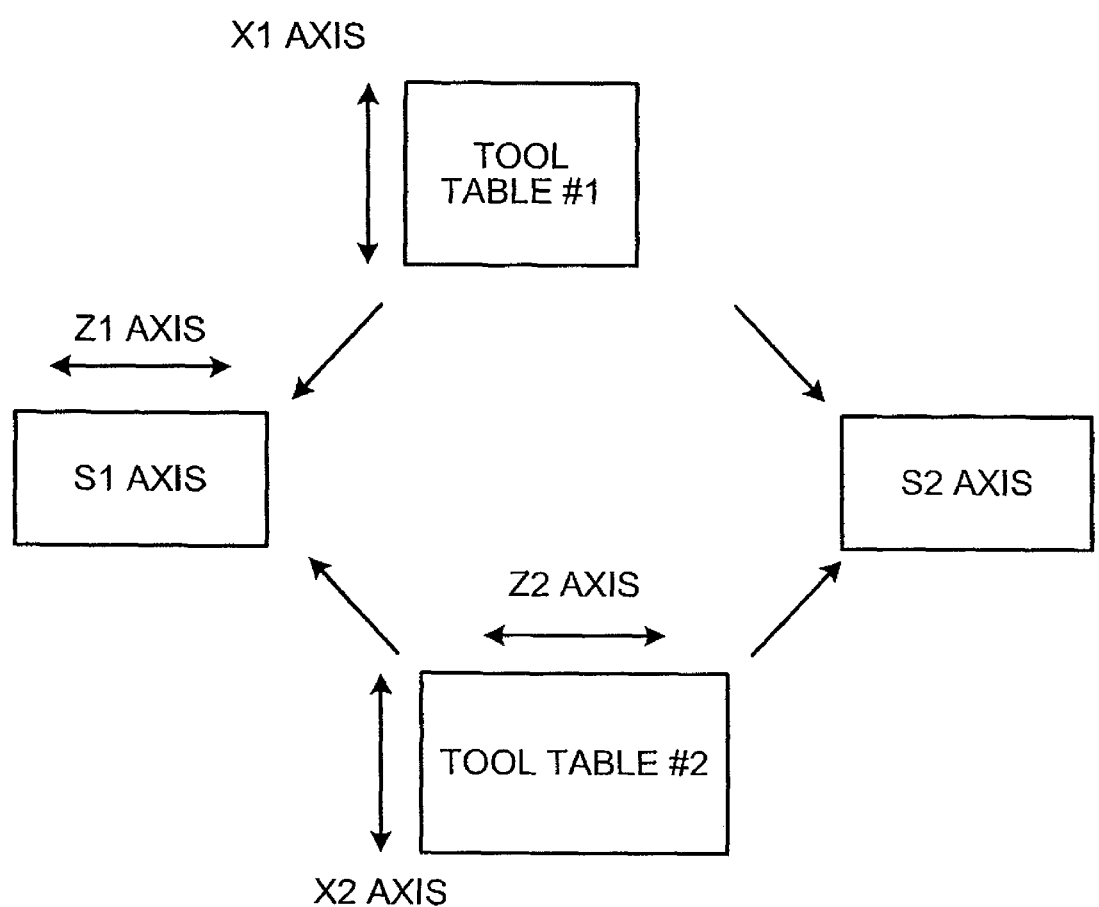
FIG. 31 is an axis configuration example of machine tools that can be controlled by the conventional multi-axis/multi-system NC apparatus.

Within a switching program of a main-axis station of the NC#2, an axis exchange request of the C axis (main axis) of each system is performed following the flowchart of FIG. 29. For example, in the system 1 of the NC#2, the first cycle has an axis configuration of the X5 axis, the Z5 axis, the Y5 axis, and the C3 axis (S3 axis), the second cycle has an axis configuration of the X5 axis, the Z5 axis, the Y5 axis, and the C4 axis (S4 axis), the third cycle has an axis configuration of the X5 axis, the Z5 axis, the Y5 axis, and the C5 axis (S5 axis), the fourth cycle has an axis configuration of the X5 axis, the Z5 axis, the Y5 axis, and the C6 axis (S6 axis), the fifth cycle has an axis configuration of the X5 axis, the Z5 axis, the Y5 axis, and the C1 axis (S1 axis), and the sixth cycle has an axis configuration of the X5 axis, the Z5 axis, the Y5 axis, and the C2 axis (S2 axis). In each one cycle, when necessary, a control main axis (C axis) of each system is switched, and machining is repeated.

At this time, depending on whether the main axis (C axis) controlled in each system of the NC#1 is in a C-axis-control (position instruction) mode or a main-axis-control mode in each system, an interpolation output is transmitted as position instruction data or speed instruction data to the NC#2. The NC#2 either position-controls or speed-controls a corresponding external switching axis, following the interpolation output transmitted from the NC#1. Further, the NC#2 transmits feedback position data of the control axis to the NC#1. The NC#1 periodically obtains a feedback position transmitted from the NC#2, and can perform feed per revolution or thread cutting synchronously with a change amount.

As described above, axes that require exchanges between systems are limited to six axes including the S1 axis (C1 axis) to the S6 axis (C6 axis) in the case of the third embodiment of the present invention. Only the axes requiring exchanges are set as external switching axes, in the NC apparatus connecting the control axes, and are set as virtual-axes in the NC apparatus not connecting the control axes. With this arrangement, control can be commonly performed between NC apparatuses. In the system of each NC apparatus, a machine operator can perform interpolation control and synchronization control by combining necessary axes, without being conscious about a fact that the control axes are connected to different NC apparatuses.

INDUSTRIAL APPLICABILITY

The numerical control apparatus and the numerical control system according to the present invention are suitable to be used to increase the numbers of control axes and control systems when NC machining tools are arranged in plural and a series of machining is performed.

The invention claimed is:

1. A numerical control system comprising a first numerical control apparatus and a second numerical control apparatus, wherein
the first numerical control apparatus includes
a virtual-axis setting unit that sets a predetermined axis coupled to the second numerical control apparatus as an axis controlled by the first numerical control apparatus,
a first external-communicating unit that transmits interpolation data of an axis set by the virtual-axis setting unit to the second numerical control apparatus, and receives feedback data from the second numerical control apparatus,
a first analysis processing unit that analyzes a numerical control program,
a first interpolation control unit that interpolates a result of analysis from the first analysis processing unit based on the feedback data, and
a virtual axis control unit that outputs, when an interpolation output from the first interpolation control unit is the interpolation data of the axis set by the virtual-axis setting unit, the interpolation data to the second numerical control apparatus via the first external-communicating unit,
the second numerical control apparatus includes
an external-switching-axis setting unit that sets a predetermined axis coupled to the second numerical control apparatus as an axis controlled by the first numerical control apparatus,
a second external-communicating unit that transmits feedback data of the second numerical control apparatus to the first numerical control apparatus, and receives interpolation data of an axis set by the external-switching-axis setting unit from the first numerical control apparatus,
a second analysis processing unit that analyzes a numerical control program,
a second interpolation control unit that interpolates a result of analysis from the second analysis processing unit, and
an axis-control-right switch processing unit that switches a control right of controlling the axis set by the external-switching-axis setting unit between the first numerical control apparatus and the second numerical control apparatus, and
when the control right is switched to the first numerical control apparatus by the axis-control-right switch processing unit, the first numerical control apparatus synchronously controls a predetermined axis coupled to the first numerical control apparatus with a predetermined axis coupled to the second numerical control apparatus and set by the first virtual-axis setting unit based on the interpolation output from the first interpolation control unit.

2. The numerical control system according to claim 1, wherein at least one of the first numerical control apparatus and the second numerical control apparatus further includes a delay control unit that delays an interpolation output to an axis coupled to its respective numerical control apparatus, to match control timings of an axis coupled to the its respective numerical control apparatus and an axis coupled to other numerical control apparatus connected with each other.

3. The numerical control system according to claim 1, wherein
the interpolation output from at least one of the first interpolation control unit and the second interpolation control unit is speed instruction data, and
the feedback data from the first numerical control unit and the second numerical control unit are position data.

4. The numerical control system according to claim 1, wherein
the interpolation output from at least one of the first interpolation control unit and the second interpolation control unit is position instruction data, and
the feedback data from the first and second numerical control units is position data.

5. The numerical control system according to claim 1, wherein at least one of the first interpolation control unit and the second interpolation control unit outputs either one of speed instruction data and position instruction data corresponding to an axis set by the virtual-axis setting unit.

6. A numerical control system comprising a first numerical control apparatus and a second numerical control apparatus, wherein
the first numerical control apparatus includes
a first virtual-axis setting unit that sets a predetermined axis coupled to the second numerical control apparatus as an axis controlled by the first numerical control apparatus,
a first external-switching-axis setting unit that sets a predetermined axis coupled to the first numerical control apparatus as an axis controlled by the second numerical control apparatus,
a first external-communicating unit that transmits interpolation data of the axis set by the first virtual-axis setting unit and feedback data of the first numerical control apparatus to the second numerical control apparatus, and receives interpolation data of an axis set by the first external-switching-axis setting unit and feedback data of the second numerical control apparatus from the second numerical control apparatus,
a first analysis processing unit that analyzes a numerical control program, a first interpolation control unit that interpolates a result of analysis from the first analysis processing unit based on the feedback data of the second numerical control apparatus, a first virtual axis control unit that outputs, when an interpolation output from the first interpolation control unit is the interpolation data of the axis set by the first virtual-axis setting unit, the interpolation data to the second numerical control apparatus via the first external communicating unit, and a first axis-control-right switch processing unit that switches a control right of controlling the axis set by the first external-switching-axis setting unit between the first numerical control apparatus and the second numerical control apparatus, the second numerical control apparatus includes a second virtual-axis setting unit that sets a predetermined axis coupled to the first numerical control apparatus as an axis controlled by the second numerical control apparatus, a second external-switching-axis setting unit that sets a predetermined axis coupled to the second numerical control apparatus as an axis controlled by the first numerical control apparatus, a second external-communicating unit that transmits interpolation data of the axis set by the second virtual-axis setting unit and feedback data of the second numerical control apparatus to the first numerical control apparatus, and receives interpolation data of an axis set by the second external-switching-axis setting unit and feedback data of the first numerical control apparatus from the first numerical control apparatus, a second analysis processing unit that analyzes a numerical control program, a second interpolation control unit that interpolates a result of analysis from the second analysis processing unit based on the feedback data of the first numerical control apparatus, a second virtual axis control unit that outputs, when an interpolation output from the second interpolation control unit is the interpolation data of the axis set by the second virtual-axis setting unit, the interpolation data to the first numerical control apparatus via the second external-communicating unit, and a second axis-control-right switch processing unit that switches the control right of controlling the axis set by the second external-switching-axis setting unit between the first numerical control apparatus and the second numerical control apparatus, when the control right is switched to the first numerical control apparatus by the second axis-control-right switch processing unit, the first numerical control apparatus synchronously controls a predetermined axis coupled to the first numerical control apparatus with a predetermined axis coupled to the second numerical control apparatus and set by the first virtual-axis setting unit based on the interpolation output from the first interpolation control unit, and when the control right is switched to the second numerical control apparatus by the first axis-control-right switch processing unit, the second numerical control apparatus synchronously controls a predetermined axis coupled to the second numerical control apparatus with a predetermined axis coupled to the first numerical control apparatus and set by the second virtual-axis setting unit based on the interpolation output from the second interpolation control unit.

7. The numerical control system according to claim 6, wherein at least one of the first numerical control apparatus and the second numerical control apparatus further includes a delay control unit that delays an interpolation output to an axis coupled to its respective numerical control apparatus, to match control timings of an axis coupled to the its respective numerical control apparatus and an axis coupled to other numerical control apparatus connected with each other.

8. The numerical control system according to claim 6, wherein
the interpolation output from at least one of the first interpolation control unit and the second interpolation control unit is speed instruction data, and
the feedback data from the first numerical control unit and the second numerical control unit are position data.

9. The numerical control system according to claim 6, wherein
the interpolation output from at least one of the first interpolation control unit and the second interpolation control unit is position instruction data, and
the feedback data from the first and second numerical control units is position data.

10. The numerical control system according to claim 6, wherein at least one of the first interpolation control unit and the second interpolation control unit outputs either one of speed instruction data and position instruction data corresponding to an axis set by the virtual-axis setting unit.

11. A numerical control system comprising a first numerical control apparatus and a second numerical control apparatus, wherein
the first numerical control apparatus includes
a first virtual-axis setting unit that sets a predetermined axis coupled to the second numerical control apparatus as an axis controlled by the first numerical control apparatus,
a first external-switching-axis setting unit that sets a predetermined axis coupled to the first numerical control apparatus as an axis controlled by the second numerical control apparatus,
a first external-communicating unit that transmits interpolation data of the axis set by the first virtual-axis setting unit and feedback data of the first numerical control apparatus to the second numerical control apparatus, and receives interpolation data of an axis set by the first external-switching-axis setting unit and feedback data of the second numerical control apparatus from the second numerical control apparatus,
a first axis-exchange control unit that performs an axis exchange between an axis of a predetermined system coupled to the first numerical control apparatus and an axis of a predetermined system coupled to the second numerical control apparatus and set by the virtual-axis setting unit,
a first analysis processing unit that analyzes a numerical control program,
a first interpolation control unit that interpolates a result of analysis from the first analysis processing unit based on the feedback data of the second numerical control apparatus and interpolates in a system of a combination of axes exchanged by the first axis exchange control unit,
a first virtual axis control unit that outputs, when an interpolation output from the first interpolation control unit is interpolation data of the axis set by the first virtual-axis setting unit, the interpolation output to the second numerical control apparatus via the first external communicating unit, and a first axis-control-right switch processing unit that switches a control right of controlling the axis set by the first external-switching-axis setting unit between the first numerical control apparatus and the second numerical control apparatus, the second numerical control apparatus includes a second virtual-axis setting unit that sets a predetermined axis coupled to the first numerical control apparatus as an axis controlled by the second numerical control apparatus, a second external-switching-axis setting unit that sets a predetermined axis coupled to the second numerical control apparatus as an axis controlled by the first numerical control apparatus, a second external-communicating unit that transmits interpolation data of the axis set by the second virtual-axis setting unit and feedback data of the second numerical control apparatus to the first numerical control apparatus, and receives interpolation data of an axis set by the second external-switching-axis setting unit and feedback data of the first numerical control apparatus from the first numerical control apparatus, a second axis-exchange control unit that performs an axis exchange between an axis of a predetermined system coupled to the second numerical control apparatus and an axis of a predetermined system coupled to the first numerical control apparatus and set by the second virtual-axis setting unit, a second analysis processing unit that analyzes a numerical control program, a second interpolation control unit that interpolates a result of analysis from the second analysis processing unit based on the feedback data of the first numerical control apparatus and interpolates in a system of a combination of axes exchanged by the second axis-exchange control unit, a second virtual axis control unit that outputs, when an interpolation output from the second interpolation control unit is interpolation data of the axis set by the second virtual-axis setting unit, the interpolation output to the first numerical control apparatus via the second external-communicating unit, and a second axis-control-right switch processing unit that switches control the right of controlling the axis set by the second external-switching-axis setting unit between the first numerical control apparatus and the second numerical control apparatus, when the control right is switched to the first numerical control apparatus by the second axis-control-right switch processing unit, the first numerical control apparatus controls an axis exchanged with an axis of a predetermined system coupled to the second numerical control apparatus and coupled to the first numerical control apparatus, as an axis of a predetermined system coupled to the first numerical control apparatus, synchronously with the axis of the predetermined system coupled to the first numerical control apparatus, based on the interpolation output from the first interpolation control unit, and when the control right is switched to the second numerical control apparatus by the first axis-control-right switch processing unit, the second numerical control apparatus controls an axis exchanged with an axis of a predetermined system coupled to the first numerical control apparatus and also coupled to the second numerical control apparatus, as an axis of a predetermined system coupled to the second numerical control apparatus, synchronously with the axis of the predetermined system coupled to the second numerical control apparatus, based on the interpolation output from the second interpolation control unit.

12. The numerical control system according to claim 11, wherein at least one of the first numerical control apparatus and the second numerical control apparatus further includes a delay control unit that delays an interpolation output to an axis coupled to its respective numerical control apparatus, to match control timings of an axis coupled to the its respective numerical control apparatus and an axis coupled to other numerical control apparatus connected with each other.

13. The numerical control system according to claim 11, wherein
the interpolation output from at least one of the first interpolation control unit and the second interpolation control unit is speed instruction data, and
the feedback data from the first numerical control unit and the second numerical control unit are position data.

14. The numerical control system according to claim 11, wherein
the interpolation output from at least one of the first interpolation control unit and the second interpolation control unit is position instruction data, and
the feedback data from the first and second numerical control units is position data.

15. The numerical control system according to claim 11, wherein at least one of the first interpolation control unit and the second interpolation control unit outputs either one of speed instruction data and position instruction data corresponding to an axis set by the virtual-axis setting unit.

* * * * *